United States Patent
Ideura

(10) Patent No.: US 6,714,143 B2
(45) Date of Patent: Mar. 30, 2004

(54) AUXILIARY KEYBOARD AND KEYBOARD IMPROVED IN OPERABILITY FOR KEY INPUT, AND CONTROL METHOD THEREFOR

(75) Inventor: Katsuji Ideura, Tokyo (JP)

(73) Assignee: Fujitsu Takamisawa Component Limited, Tokyo (JP)

( * ) Notice: Subject to any disclaimer, the term of this patent is extended or adjusted under 35 U.S.C. 154(b) by 512 days.

(21) Appl. No.: 09/778,789

(22) Filed: Feb. 8, 2001

(65) Prior Publication Data

US 2001/0030613 A1 Oct. 18, 2001

(30) Foreign Application Priority Data

Apr. 13, 2000 (JP) .......................................... 2000-117213

(51) Int. Cl.⁷ .......................... H03K 17/94; H03M 11/00
(52) U.S. Cl. ............................ 341/23; 341/22; 361/686; 345/168
(58) Field of Search ............................. 341/22, 23, 26; 361/680, 686; 345/168, 172

(56) References Cited

U.S. PATENT DOCUMENTS

| | | | | |
|---|---|---|---|---|
| 5,341,154 A | * | 8/1994 | Bird | 345/168 |
| 5,402,121 A | * | 3/1995 | Noorbehesht | 341/26 |
| 6,040,977 A | * | 3/2000 | Hofer | 361/680 |
| 6,262,716 B1 | * | 7/2001 | Raasch | 341/22 |
| 6,388,660 B1 | * | 5/2002 | Manser et al. | 345/173 |
| 6,545,668 B1 | * | 4/2003 | Hayama | 345/168 |

FOREIGN PATENT DOCUMENTS

JP  2-230413  9/1990

* cited by examiner

*Primary Examiner*—Timothy Edwards
(74) *Attorney, Agent, or Firm*—Staas & Halsey LLP

(57) ABSTRACT

An auxiliary keyboard has a first input mode and a second input mode and comprises an input mode switching key, a mode switching unit for switching between the first input mode and second input mode at each depression of the input mode switching key without posting the depression to a computer, a key code sending unit for sending, when the key of the auxiliary keyboard is depressed, a predetermined first key code corresponding to the depressed key of the auxiliary keyboard either in the first input mode or in the second input mode, and a mode correcting unit for correcting, when the input mode of the main keyboard is switched into the numeric data input mode, the numeric data input mode to the character data input mode.

16 Claims, 15 Drawing Sheets

Fig. 3
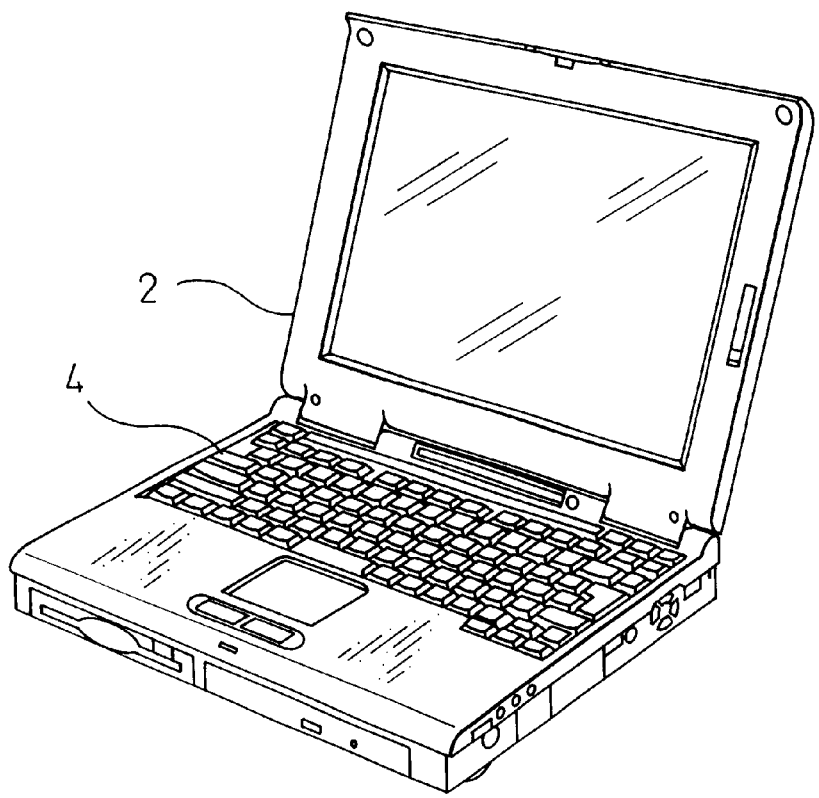
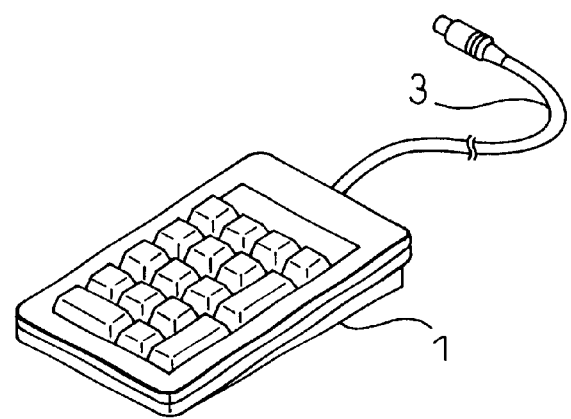

Fig.9

| NumLock STATE OF MAIN KEYBOARD | INTERNAL PSEUDO NumLock STATE OF TEN KEY KEYBOARD | DEPRESSION OF "$4" KEY OF MAIN KEYBOARD | DEPRESSION OF "4←" KEY OF TEN KEY KEYBOARD |
|---|---|---|---|
| OFF | ON | INDICATION OF "4" | INDICATION OF "4" |
| OFF | OFF | INDICATION OF "4" | CURSOR MOVEMENT |

Fig.15

|   | TEN KEY KEYBOARD | COMPUTER |
|---|---|---|
| A | OFF | ON → OFF → ON |
| B | ON | MAINTAIN ON STATE |
| C | OFF | MAINTAIN OFF STATE |
| D | ON | OFF → ON → OFF |

AUXILIARY KEYBOARD AND KEYBOARD IMPROVED IN OPERABILITY FOR KEY INPUT, AND CONTROL METHOD THEREFOR

BACKGROUND OF THE INVENTION

1. Field of the Invention

The present invention relates to the improvement in function of a keyboard used as an input device for a computer system.

2. Description of the Related Art

In recent years, notebook personal computers have been required to be, especially, compact and lightweight. For example, regarding the keyboards of notebook personal computers, key arrangements thereof have been modified compared to key arrangements of the keyboards of desktop computers.

The keyboards (hereunder referred to as main keyboards) of notebook personal computers include no independent ten-key pad provided as a key array on a keyboard of a desktop personal computer so as to facilitate the entering of numeric data. Therefore, when a user enters numeric data, usually, he utilizes numeric keys of a key array 11 provided as a part of what is called an "E-line" of ordinary character keys (for instance, on the Japanese 109 Keyboard) of the main keyboard, or alternatively, brings the keyboard into a ten key input mode by using a Numlock (or Numeric Lock) function.

The ten key input mode is a mode in which a part of the character keys are changed in function so as to provide a ten-key pad. Generally, the main keyboard is brought into a mode (or an ON mode of Numlock state or status, that is, the ten key input mode), in which the ten key input of data can be performed from a predetermined key array by depressing keys called Numlock keys. When the Numlock key is depressed again, the keyboard is returned to an ordinary state thereof (namely, an OFF mode (hereunder referred to as an ordinary input mode) of the Numlock state).

In the case that the main keyboard is in the ten key input mode, keys for entering character data other than the numeric data are locked in the key array of the main keyboard of the notebook personal computer, and thus cannot be used. Therefore, in the case that character data is inputted from the main keyboard, it is inconvenient that the Numlock function must be canceled by putting the Numlock state into the OFF mode.

Further, external ten key keyboards do not have backspace keys. Thus, in the case that during numeric data is inputted by utilizing the ten key keyboard in the ten key input mode, a cursor is moved and an erroneously inputted character is deleted by using a Delete key or utilizing the Backspace key provided on the main keyboard after this keyboard is put into the ordinary input mode by bringing the Numlock state into the OFF mode to thereby cancel the Numlock function. Therefore, this is inconvenient in the case that character data is erroneously inputted when numerical data is inputted by using the ten key keyboard when a calculator program serving as an application program is utilized.

Accordingly, an object of the present invention is to provide a keyboard improved in operability for key input.

SUMMARY OF THE INVENTION

To achieve the foregoing object, according to an aspect of the present invention, there is provided an auxiliary keyboard, which is a first embodiment and is connected to a computer having a main keyboard, which has a main input mode switching key for switching an input mode between a numeric data input mode and a character data input mode, and is provided with a plurality of keys, having a first input mode and a second input mode. This auxiliary keyboard comprises an input mode switching key, mode switching means for switching between the first input mode and second input mode at each depression of the input mode switching key, without indicating the depression to the computer, key code sending means for sending, when the key of the auxiliary keyboard is depressed, a predetermined first key code corresponding to the depressed key of the auxiliary keyboard either in the first input mode or in the second input mode, and mode correcting means for correcting, when the input mode of the main keyboard is switched into the numeric data input mode, the numeric data input mode to the character data input mode.

Further, a second embodiment of the present invention is provided by allocating a second key code, which differs from the first key code, in the auxiliary keyboard that is the first embodiment of the present invention.

According to another aspect of the present invention, there is provided a keyboard that is a third embodiment of the present invention and adapted to assign two functions to one input to have two input modes, in each of which a corresponding one of the two functions is selected, and connected to a computer. This keyboard has the two input modes independently of the computer and comprises mode detecting means for detecting a mismatch between an input mode of the keyboard and an input mode of the computer, and key code sending means for adding, when the mismatch is detected by the mode detecting means and then a specific key having the two alternative input modes is depressed, switch key codes to before and after a key code corresponding to the specific key and for sending the key codes.

According to the first embodiment of the present invention, the function corresponding to each of keys arranged on the main keyboard can be always utilized. Moreover, regarding the auxiliary input keyboard, the mode transition between the first input mode and the second input mode is easily achieved. This results in improvement in operability for input to the computer.

According to the second embodiment of the present invention, a mode, in which the second key code differing from the predetermined ordinary key code is sent only by being processed in the auxiliary keyboard, is established in the auxiliary keyboard. Thus, the function of the auxiliary keyboard can be expanded without affecting the computer and the main keyboard.

According to the third embodiment of the present invention, when the specific key having the selected one of the different two input modes is depressed, it is determined whether or not the switching of the input mode of the computer is necessary. Thus, users can use the ten key keyboard without concern about operating the Numlock key. Consequently, the operability for input to the computer can be improved.

BRIEF DESCRIPTION OF THE DRAWINGS

Other features, objects and advantages of the present invention will become apparent from the following description of preferred embodiments with reference to the drawings in which like reference characters designate like or corresponding parts throughout several views, and in which:

FIG. 3 is a diagram illustrating the use of a ten key keyboard that is a first embodiment of the present invention;

FIG. 9 is a table describing the relation among the Numlock state of each mode and depressed keys;

FIG. 15 is a table illustrating the combinations of the Numlock states of the ten key keyboard and the computer of the third embodiment of the present invention.

DETAILED DESCRIPTION OF THE PREFERRED EMBODIMENTS

Before proceeding to the detailed description of the preferred embodiments of the present invention, a prior art is described hereinbelow with reference to the accompanying drawings, to clarify the differences between the prior art and the present invention.

Figure 1:
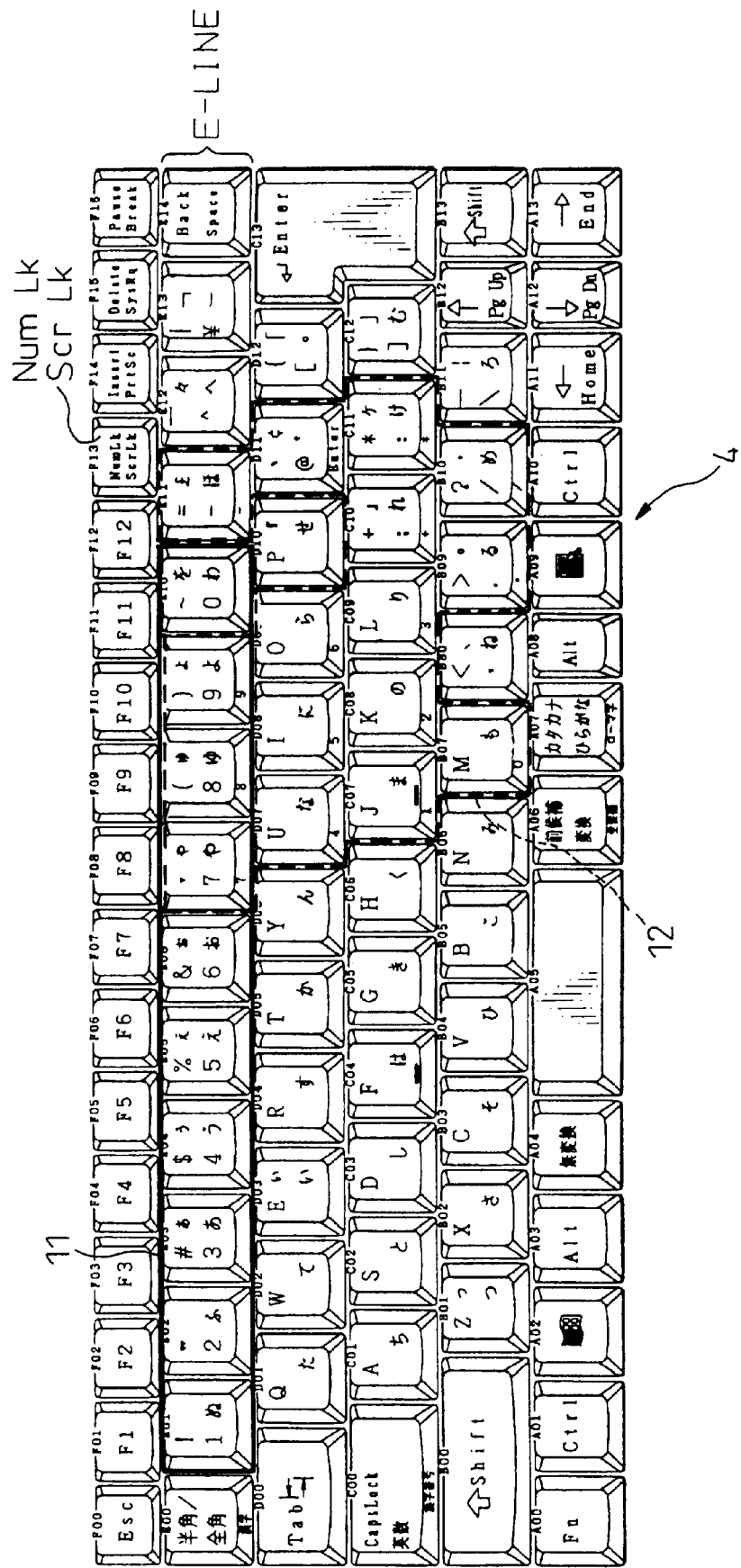
FIG. 1 is a diagram illustrating a key layout of a conventional keyboard for a notebook personal computer.

FIG. 1 is a diagram illustrating a key layout of a conventional keyboard of a notebook personal computer.

A main keyboard 4 of the notebook personal computer does not have independent ten-key pad that are provided in a desktop personal computer as a key array for facilitating the input of numerical data. Therefore, when an operator enters numerical data, usually, he utilizes numeric keys of a key array 11 provided as a part of what is called an "e-line" of ordinary character keys (for instance, on the Japanese 109 Keyboard) of the main keyboard 4, or alternatively, brings the keyboard into a ten key input mode by using a Numlock (or Numeric Lock) function.

The ten key input mode is a mode in which a part of the character keys are changed in function so as to provide a ten-key pad. Generally, the main keyboard is brought into a mode (or an ON mode of Numlock state, that is, the ten key input mode), in which the ten key input of data can be performed from a predetermined key array 12 of FIG. 1 by depressing keys called Numlock keys (namely, keys indicated by "NumLk" and "ScrLk" in FIG. 1). When the Numlock key is depressed, the keyboard is returned to an ordinary state thereof (namely, an OFF mode, that is, the ordinary input mode in the Numlock state).

Figure 2:
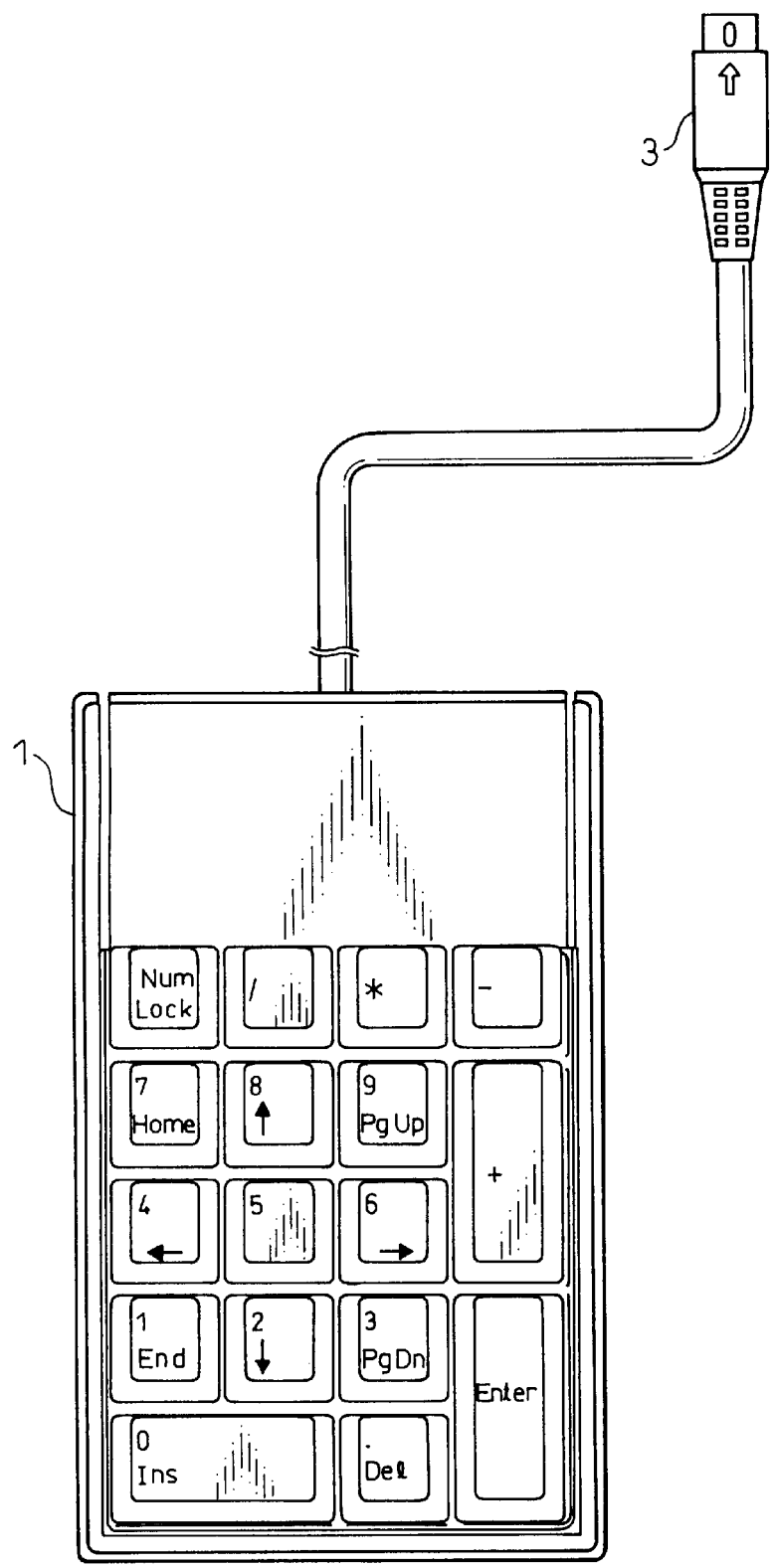
FIG. 2 is a diagram illustrating a key layout of a ten key keyboard.

Further, in recent years, ten key keyboards have been frequently used as external auxiliary keyboards for notebook personal computers. FIG. 2 is a diagram illustrating a key layout of a ten key keyboard. The ten key keyboard is connected to a notebook personal computer by using a general purpose interface cable, such as a USB or PS/2 cable. Usually, the ten key keyboard has a control IC that independent of a control IC of the main keyboard of the notebook personal computer. Moreover, as illustrated in FIG. 2, generally, the key arrangement of the ten key keyboard 1 is obtained by eliminating the key array 12 serving as ten-key pad from the ordinary main keyboard 4 shown in FIG. 1.

In the case of the ten key keyboard 1 illustrated in FIG. 2, the mode transition between the ten key input mode and the ordinary input mode can be performed by depressing the Numlock key, as in the case of the keyboard shown in FIG. 1.

When numeric data is entered by using the ten key keyboard 1, the Numlock state is put into an ON mode by depressing the Numlock key of the ten key keyboard 1 or the main keyboard 4. Thus, the transition of the input mode of the ten key keyboard 1 to the ten key input mode is achieved. Thereafter, when the Numlock key is depressed again, the Numlock state is returned to an OFF mode. Thus, the ten key input mode is canceled. Consequently, ordinary key input operations and other key operations, such as a cursor movement, are enabled. It is sufficient that the depression of the Numlock key is performed on one of the ten key keyboard 1 and the main keyboard 4.

Next, the operating principle of the conventional ten key keyboard is briefly described hereinbelow.

First, a Numlock key code is outputted at each depression of the Numlock key of the ten key keyboard 1 or the main keyboard 4, and transmitted to a CPU (hereunder referred to as a host) of the personal computer. After the reception of the Numlock key code, the host sends an LED turning-on command or an LED turning-off command to the ten key keyboard 1 and the main keyboard 4. The LED turning-on command and the LED turning-off command are commands for turning on and off a Numlock state indicating LED usually provided in the vicinity of the main keyboard 4. According to the turned-on or turned-off state of the LED, users can check which of the ON mode and the OFF mode the Numlock state is in. The generation of such an LED turning-on command or an LED turning-off command is performed at each depression of the Numlock key.

Generally, the LED turning-on command or the LED turning-off command is used for the mode transition to be performed on the ten key keyboard 1 and the main keyboard 4. That is, the transition of the input mode between the ten key input mode (namely, a mode in which the Numlock state is in the ON mode) and the ordinary input mode (namely, a mode in which the Numlock state is in the OFF mode) of each of the ten key keyboard 1 and the main keyboard 4 occurs at each reception of the LED turning-on command or the LED turning-off command. As described above, the mode transition of the input mode between the ten key input mode and the ordinary input mode is achieved by depressing the Numlock key.

In the ordinary input mode, the cursor movement and the key input of, for instance, the Page Up key (Pg Up) can be achieved on the ten key keyboard, as illustrated in FIG. 2. Further, ordinary key input operations can be performed on the main keyboard.

In the ten key input mode, numeric data can be inputted from the ten key keyboard 1. Moreover, numeric data can be inputted from the key array 12 provided on the main keyboard 4 corresponding to the ten-key pad illustrated in FIG. 1.

Each key on the ten key keyboard corresponds to a key code, which is outputted by depressing such a key, in one-to-one correspondence. The host selects a function, which is to be assigned to each of the keys, according to the corresponding key code and the Numlock state, and then performs the selected function.

Next, a ten key keyboard according to the present invention is described hereinbelow.

Figure 4:
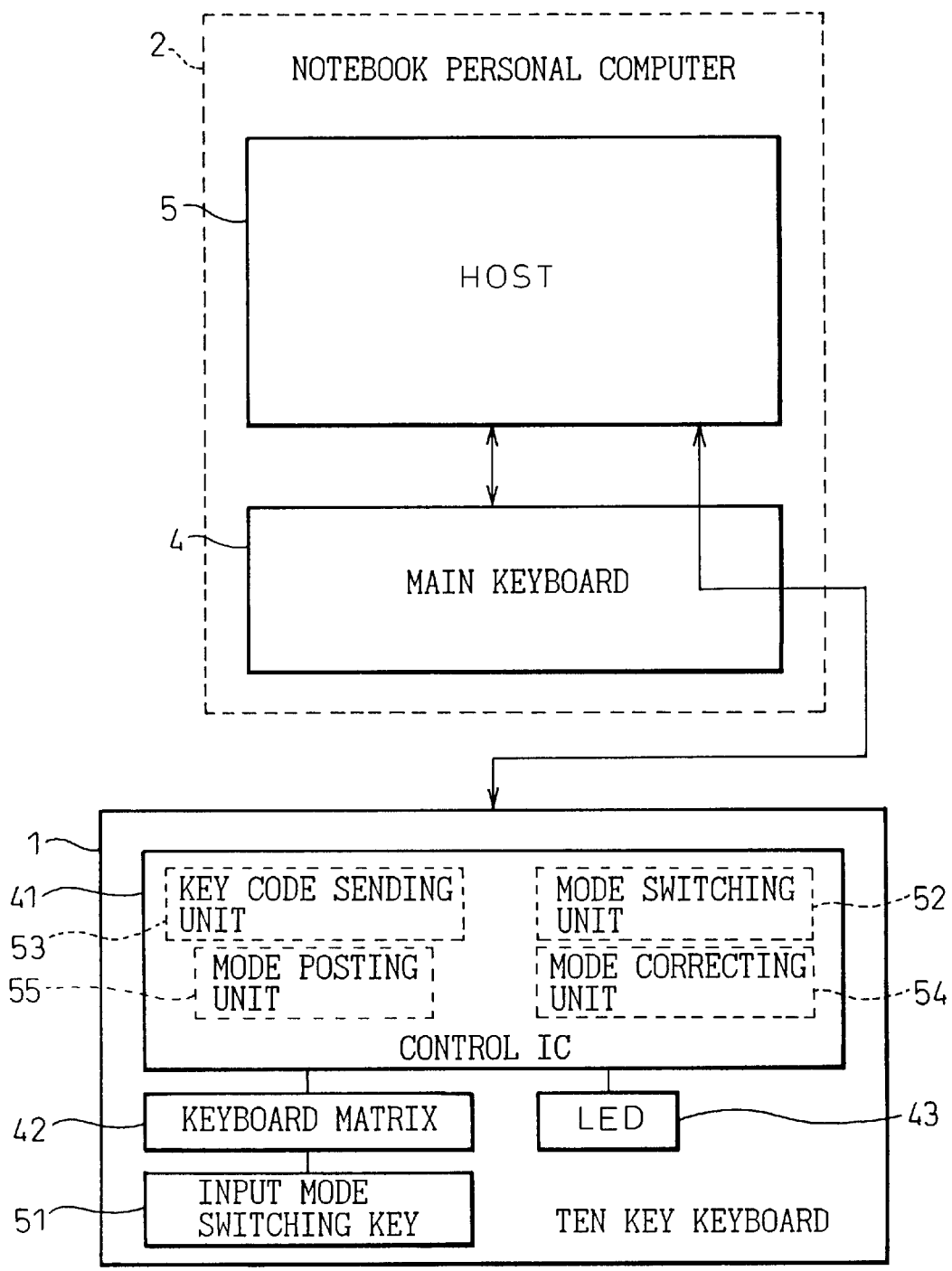
FIG. 4 is a schematic diagram illustrating the relation between a main keyboard and the ten key keyboard of the first embodiment of the present invention.

FIG. 3 is a diagram illustrating the use of the ten key keyboard, which is a first embodiment of the present invention. FIG. 4 is a schematic diagram illustrating the relation between the main keyboard and the ten key keyboard.

As illustrated in FIG. 3, the ten key keyboard, that is, the first embodiment of the present invention is used by being externally connected to the notebook personal computer 2 through the general purpose interface cable 3.

Further, as illustrated in FIG. 4, the notebook personal computer 2 consists of a host 5 for controlling the entire PC, and the main keyboard 4. The ten key keyboard 1 is connected to the host 5 through the main keyboard 4.

The ten key keyboard 1 according to the present invention comprises an input mode switching key 51, a mode switching means 52 for switching between the input modes at each depression of the input mode switching key 51 without posting the depression to the host 5, a key code sending means 53 for sending, when the key of the ten key keyboard 1 is depressed, a predetermined key code corresponding to the depressed key of the ten key keyboard in either of the input modes, and a mode correcting means 54 for correcting, when the input mode of the main keyboard 4 is switched into the numeric data input mode, the numeric data input mode to the character data input mode. Moreover, this ten key keyboard may further have a mode posting means 55 for posting information to the computer so as to indicate on a screen of a display unit of the computer which of the two input modes the keyboard is in. This ten key keyboard 1 has a control IC 41, a keyboard matrix 42, and an LED 43.

The functions of the mode switching means 52, the key code sending means 53, the mode correcting means 54, and the mode posting means 55 are implemented by the control IC 141. The depression of the input mode switching key 51 is detected by the keyboard matrix 42. The Numlock state of the ten key keyboard is indicated to users by the turning-on or turning-off of the LED 43.

The ten key keyboard, which is the first embodiment of the present invention and described hereinbelow, is usually used by being connected to a notebook personal computer. However, this ten key keyboard may be used by being connected to a desktop personal computer. Furthermore, as will be described later, a Numlock key is used as the input mode switching key 51. However, another key or a combination of other keys on the ten key keyboard 1 may be used for switching between the input modes. Alternatively, an additional key may be provided for switching between the input modes.

Incidentally, for the sake of simplicity of description, it is assumed that the default input mode of the Numlock state, which is recognized by the host 5 just after the power supply of the PC is turned on, of each of the ten key keyboard 1 and the main keyboard 4 is an OFF mode.

In this embodiment, first, when the power supply of the notebook personal computer 2 is turned on, an initialization process is performed. The Numlock state of the main keyboard 4 is set in an OFF mode by this initialization process before a user actually uses the notebook personal computer 2 to which the ten key keyboard 1 is connected. Furthermore, as will be described later, this embodiment is adapted so that the Numlock state of the main keyboard 4 is always in the OFF mode upon completion of the initialization process.

Figure 5:
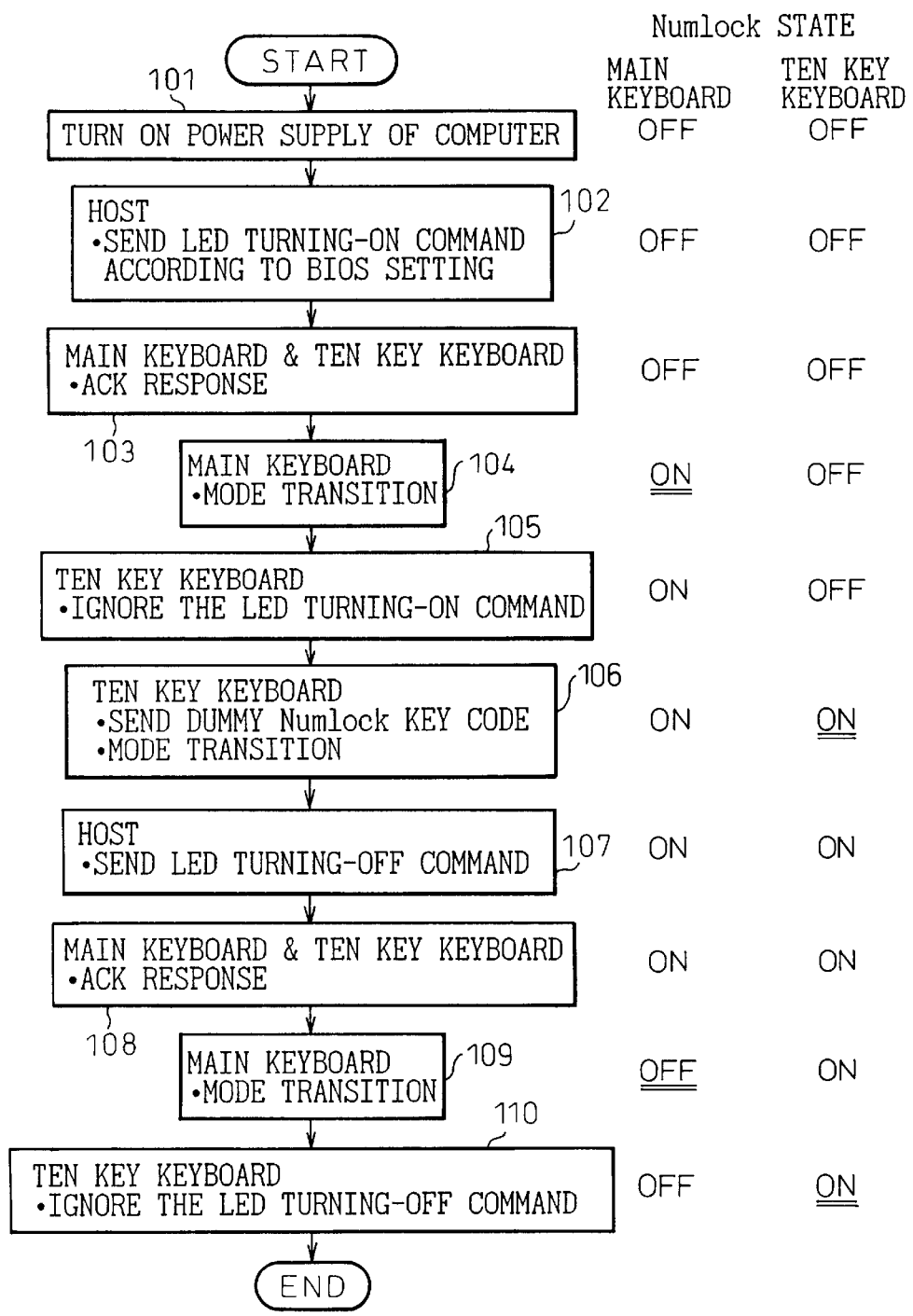
FIG. 5 is a flowchart illustrating an initialization process of the first embodiment of the present invention.

FIG. 5 is a flowchart illustrating the initialization process of the first embodiment of the present invention. In this figure, for easily understanding of the present invention, the Numlock states of the ten key keyboard 1 and the main keyboard 4 are described at the right-hand side of each step.

When the power supply of the notebook personal computer is turned on at step 101, the host 5 sends an LED turning-on command, which directs the turning-on or turning-off the Numlock state indicating LED, to the ten key keyboard 1 and the main keyboard 4 according to the BIOS settings.

The LED turning-on command is a command for directing the turning-on or turning-off of the Numlock state indicating LED. Users can distinguishing according to the turned-on or turned-off state of the Numlock state indicating LED which of the ON mode and the OFF mode the Numlock state is in. Incidentally, the generation of such an LED turning-on command is usually performed in the host 5 at each reception of a Numlock key.

At step 103, each of the ten key keyboard 1 and the main keyboard 4 receives the LED turning-on command and sends an ACK response. As described above, the LED turning-on command is used for transition of the input mode of the keyboard, in addition to the direction of the turning-on or turning-off of the Numlock state indicating LED. Thus, the main keyboard 4 receives the LED turning-on command, so that the transition of the input mode of the main keyboard 4 is performed. Consequently, the Numlock state is put into the ON mode at step 104. However, at step 105, the ten key keyboard of this embodiment ignores the LED turning-on command, so that the Numlock state remains in the OFF mode.

Subsequently, at step 106, the ten key keyboard 1 furthermore sends a dummy Numlock key code to the host 5 so as to bring the Numlock state of the main keyboard 4 into the OFF mode. That is, the ten key keyboard 1 sends the dummy Numlock key code without depressing the Numlock key on the ten key board 1. On the other hand, the transition of the mode of the Numlock state of the ten key keyboard 1 from the OFF mode to the ON mode is achieved.

When the host 5 receives the dummy Numlock key code from the ten key keyboard 1, the LED turning-off command is sent to the ten key keyboard 1 and the main keyboard 4.

At step 108, each of the ten key keyboard 1 and the main keyboard 4 receives the LED turning-off command and sends an ACK response to the host 5. In response to this LED turning-off command, the mode of the Numlock state of the main keyboard 4 is changed into the OFF mode at step 109. However, in the case of the ten key keyboard 1 according to this embodiment, at step 110, the LED turning-off command is ignored, so that the Numlock state remains in the ON mode.

The initialization of each of the ten key keyboard 1 and the main keyboard 4 is completed by performing the aforementioned initialization process. Thus, the Numlock state of the main keyboard 4 can be put into the OFF mode.

Incidentally, as will be described later, the transition of the mode of the Numlock state occurs only in the ten key keyboard 1 after the completion of the initialization process. Thus, especially, the Numlock state of the ten key keyboard 1 after the completion of the initialization process will be referred to as an "internal pseudo Numlock state".

Next, a process of a mode transition caused by operating the Numlock key on the ten key keyboard, which is the first embodiment of the present invention, is described hereinbelow.

Figure 6:
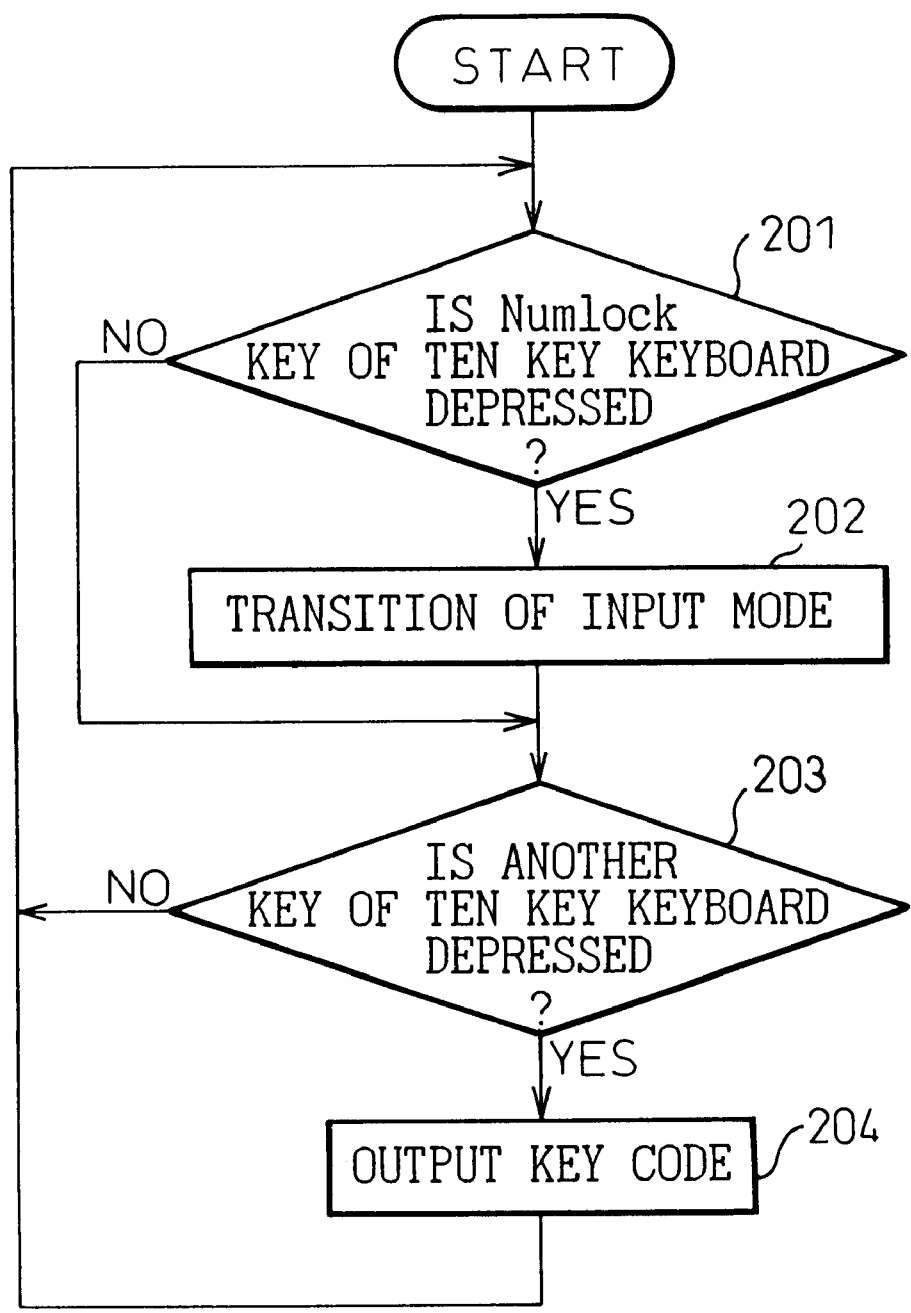
FIG. 6 is a flowchart illustrating a mode transition of the ten key keyboard of the first embodiment of the present invention.

FIG. 6 is a flowchart illustrating the mode transition of the ten key keyboard that is the first embodiment of the present invention.

At step 201, the control IC of the ten key keyboard 1 judges whether or not the Numlock key on the ten key keyboard 1 is depressed. When it is judged that the Numlock key is depressed, control advances to step 202.

At step 202, the control IC of the ten key keyboard 1 does not send a Numlock key code to the host 5. Instead, the control IC causes the mode transition of the internal pseudo Numlock state of the ten key keyboard 1. That is, in the case of the ten key keyboard 1, when the internal pseudo Numlock state is in the ON mode, this Numlock is put into the OFF mode. Conversely, when the internal pseudo Numlock state is in the OFF mode, this Numlock is put into the ON mode. On the other hand, the host 5 does not receive the Numlock key code. Thus, the host 5 does not send the LED turning-on command to the main keyboard 4. Therefore, the Numlock state is maintained in the OFF mode.

When a key on the ten key keyboard 1 is depressed in step 203, a key code corresponding to the depressed key is outputted, as described at step 204. This key code output operation will be described later.

Thus, according to this embodiment, even when the Numlock key on the ten key keyboard is depressed, the control IC of the ten key keyboard 1 does not send a Numlock key code but causes the mode transition of the internal pseudo Numlock state concerning the ten key keyboard 1. Therefore, the Numlock state of the main keyboard 4 can be always maintained in the OFF mode, namely, in the ordinary input mode. Thus, at each depression of the Numlock key on the ten key keyboard 1, the transition of the mode of the Numlock state corresponding only to the ten key keyboard 1 is caused between the ordinary input mode and the ten key input mode.

Next, a process to be performed in the case of depressing a Numlock key on the main keyboard 4, instead of the Numlock key on the ten key keyboard 1, is described hereinbelow.

Figure 7:
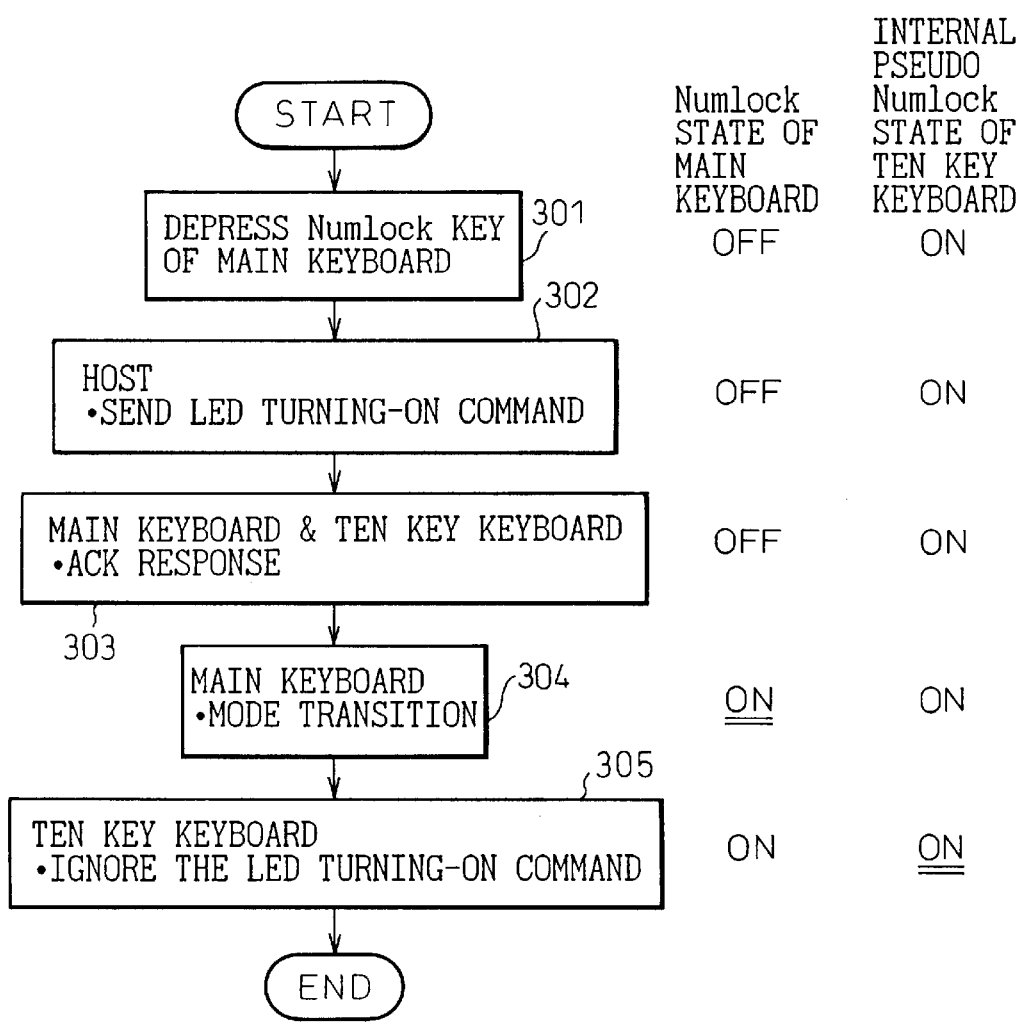
FIG. 7 is a flowchart illustrating a process to be performed when a Numlock key of the main keyboard is depressed.

FIG. 7 is a flowchart illustrating the process to be performed in the case of depressing the Numlock key on the main keyboard 4. In this figure, for readily understanding of the present invention, the Numlock states of the ten key keyboard 1 and the main keyboard 4 are described at the right-hand side of each step.

Incidentally, it is assumed that the Numlock key on the main keyboard 4 is depressed when the Numlock state of the main keyboard 4 is in the OFF state and the internal pseudo Numlock state of the ten key keyboard 1 is in the ON state.

At step 301, when the Numlock key on the main keyboard 4 is depressed, a corresponding Numlock key code is sent to the host 5.

When receiving the Numlock key code from the main keyboard 4, the host 5 sends an LED turning-on command to the ten key keyboard 1 and the main keyboard 4 at step 302.

Subsequently, the ten key keyboard 1 and the main keyboard 4 receive the LED turning-on command and send an ACK response to the host 5 at step 303.

Then, the transition of the mode of the Numlock state of the main keyboard 4 to the ON mode is performed at step 304.

On the other hand, the ten key keyboard 1 according to this embodiment ignores the LED turning-on command sent from the host 5. Thus, the internal pseudo Numlock state remains in the ON mode at step 305.

The operation to be performed in steps 301 to 305 is inevitably caused when the Numlock key on the main keyboard 4 is depressed. Thus, it is necessary to put back the resultant ON mode of the Numlock state of the main keyboard 4 to the OFF mode again.

As described above, according to the first embodiment of the present invention, when the Numlock key on the ten key keyboard 1 is depressed after the completion of the initialization process, the control IC of the ten key keyboard 1 does not send a Numlock key code. Thus, the ten key keyboard 1 never receives the LED turning-on command. The reception of the LED turning-on command at the ten key keyboard 1 at step 303 is caused only in the case that the Numlock key on the main keyboard 4 is depressed.

Thus, in this embodiment, as will be described in the following description, the ten key keyboard 1 always monitors LED turning-on commands sent from the host. When receiving an LED turning-on command, the ten key keyboard 1 judges that a Numlock key on the main keyboard 4 is depressed. Then, the ten key keyboard 1 performs a process of turning back the mode of the Numlock state of the main keyboard 4 to the OFF mode.

Figure 8:
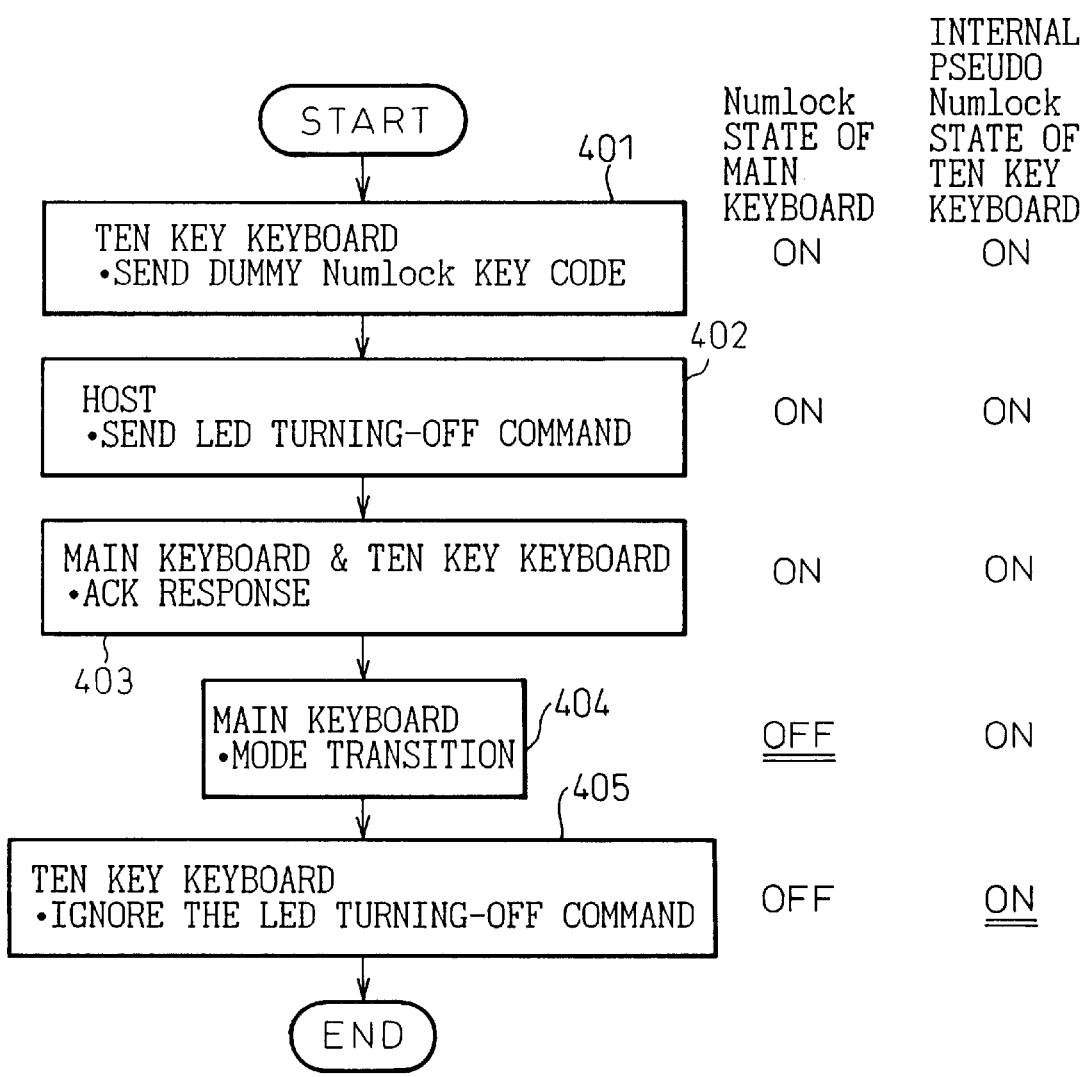
FIG. 8 is a flowchart illustrating a process of returning the Numlock state of the main keyboard of the first embodiment of the present invention to an OFF mode.

FIG. 8 is a flowchart illustrating the process of turning back the mode of the Numlock state of the main keyboard 4 to the OFF mode in the first embodiment of the present invention. In this figure, to allow understanding of the present invention, the Numlock states of the ten key keyboard 1 and the main keyboard 4 are described at the right-hand side of each step.

It is now assumed that the Numlock state of each of the keyboards at a start point in time of this flowchart is in the mode at a termination point in time of step 305 of FIG. 7 described above, namely, that the Numlock state of the main keyboard 4 is in the ON mode and the Numlock state of the ten key keyboard 1 is in the ON mode.

The ten key keyboard 1 always monitors LED turning-on commands sent from the host. When receiving an LED turning-on command, the ten key keyboard 1 sends a Numlock key code to the host 5 at step 401.

When receiving the Numlock key code from the ten key keyboard 1, the host 5 sends an LED turning-off command to the ten key keyboard 1 and the main keyboard 4 at step 402.

The ten key keyboard 1 and the main keyboard 4 receive the LED turning-off command and sends ACK responses to the host 5 at step 403.

Then, the Numlock state of the main keyboard 4 returns to the OFF mode at step 404.

On the other hand, at step 405, the ten key keyboard 1 ignores the LED turning-off command, so that the Numlock state is maintained in the ON mode.

As described above, when the Numlock key of the main keyboard 4 is depressed, the ten key keyboard 1 according to the first embodiment of the present invention monitors LED turning-off commands sent from the host 5 and outputs a dummy Numlock key code. Thus, the Numlock state of the main keyboard can be maintained in the OFF state.

In the foregoing description, the mode transition caused by depressing the Numlock key has been described. According to this embodiment, the transition of the mode of the Numlock state of only the ten key keyboard is achieved by depressing the Numlock key thereon. Moreover, the Numlock state of the main keyboard can be maintained in the OFF mode. Therefore, the ten key keyboard can easily be used in a mode switched between the ten key input mode and the ordinary input mode by depressing the Numlock key of the ten key keyboard. Simultaneously, the main keyboard can be always used in the ordinary input mode, regardless of the mode of the ten key keyboard.

Next, a code output operation to be performed after the completion of the mode is described hereinbelow.

In this embodiment, the OS (Operating System) running in the host 5 monitors the Numlock state of each of the keyboards and determines an operation to be performed at the side of the host 5 according to the Numlock state of and a key code sent from each of the keyboards.

FIG. 9 illustrates the relation between the Numlock state of each of the modes and the depressed key. As described above, the Numlock state of the main keyboard 4 is always in the OFF mode.

The key code itself sent to the host 5 by depressing the ordinary key at steps 203 and 204 of FIG. 6 is always the same code irrespectively of which of the ON mode and the OFF mode the Numlock state is in. For example, a key code outputted in the case of depressing the "$4" key on the "E-line" of the main keyboard 4 is always "05"hex. Further, a key code outputted in the case of depressing the "4←" key on the ten key keyboard 1 is always "4B" hex.

In this embodiment, as illustrated in FIG. 9, in the case that the Numlock state of the main keyboard 4 is in the OFF mode, and that the internal pseudo Numlock state of the ten key keyboard is in the ON mode, when the "4←" key on the ten key keyboard is depressed, the key code "05"hex corresponding to the "$4" key on the "E-line" is sent to the host 5. Then, the numeral "4" is indicated on the screen of the display unit according to a decision made by the OS, which is employed in the host 5. Further, when the "$4" key on the main keyboard 4 is depressed, the key code "05"hex is sent to the host 5, so that the numeral "4" is indicated on the screen of the display unit according to a decision made by the OS, which is employed in the host 5.

Further, in the case that the Numlock state of the main keyboard 4 is in the OFF mode, and that the internal pseudo Numlock OFF state of the ten key keyboard 1 is in the OFF mode, when the "4←" key on the ten key keyboard 1 is depressed, the original key code "4B"hex is transmitted to the host 5. Then, according to the decision made by the host 5, the cursor moves one character position to the left on the screen of the display unit. Furthermore, when the "$4" key on the main keyboard 4 is depressed, the key code "05"hex is sent to the host 5. Then, according to a decision made by the OS running in the host 5, the numeral "4" is indicated on the screen of the display unit.

The input mode of the ten key keyboard 1 may be indicated on the screen of the display unit of the notebook personal computer 2, instead of the Numlock state indicating LED of the ten key keyboard 1.

Thus, according to the first embodiment of the present invention, the Numlock state of the main keyboard 4 is always maintained in the OFF mode, regardless of the mode of the Numlock state of the ten key keyboard 1. Consequently, the function corresponding to each of the keys arranged on the main keyboard 4 can be always utilized.

Meanwhile, as illustrated in FIG. 2, the ten key keyboard 1 does not have a Backspace key function of deleting inputted character data. Thus, in the case that an input error is caused during, for instance, numerical data is inputted by using the ten key keyboard 1 that is in the ten key input mode, a user must extend his arm to the main keyboard 4 and perform a key operation thereon. In such a case, it is more convenient to use, for example, the Numlock key on the ten key keyboard 1 in place of the Backspace key.

Further, it is more efficient to expand the functions realized by using the ten key keyboard 1, for instance, to change the key arrangement of the keyboard 1 into another key arrangement suitable for utilizing the keyboard 1 as an electric calculator, or to utilize a specific key as a Web connecting key.

To realize such expansion of the functions, the prior art employs a method of preliminarily incorporating special driver software into the system by installing this driver software on the host. However, this method has a drawback in that the memory consumption of the main memory of the host system increases.

A second embodiment of the present invention, which will be described hereinbelow, is accomplished to eliminate such a drawback by providing an additional option mode, in which a key code is changed and outputted by the ten key keyboard of the first embodiment, to thereby expand the function of the ten key keyboard still more.

Especially, the second embodiment effectively utilizes the Numlock key on the ten key keyboard 1. As described above, in the case of the first embodiment of the present invention, the Numlock key code is not sent to the host 5 even when the Numlock key is depressed. Thus, it is very advantageous to utilize the depression of the Numlock key. Further, all operations of the second embodiment of the present invention are implemented by the control IC of the ten key keyboard 1. Thus, the functions of the ten key keyboard can be expanded without affecting the host and the main keyboard.

Figure 10:
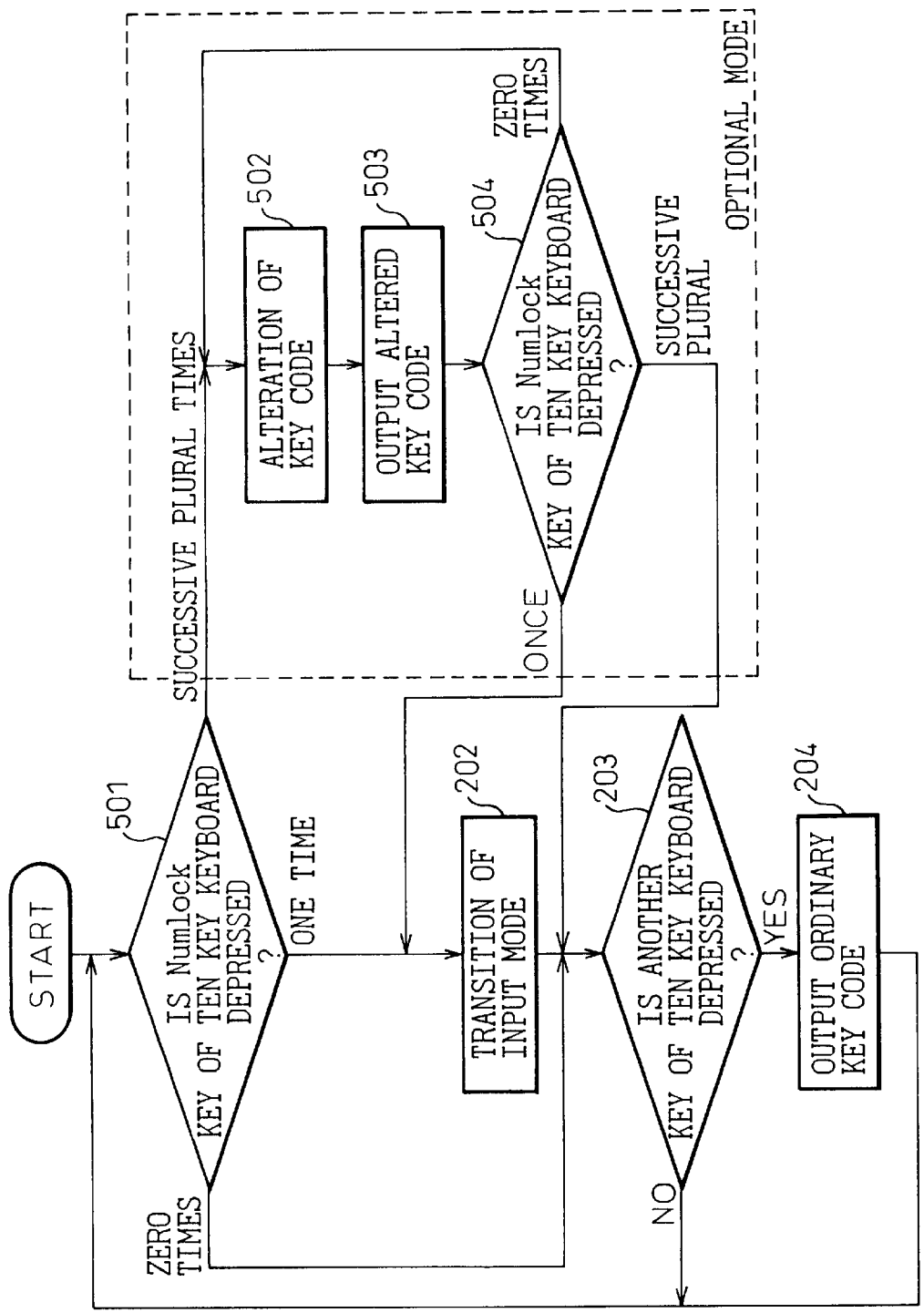
FIG. 10 is a flowchart illustrating a second embodiment of the present invention.

FIG. 10 is a flowchart illustrating the second embodiment of the present invention.

First, at step 501, it is decided how many times the Numlock key on the ten key keyboard 1 is depressed. As described above, even when the Numlock key on the ten key keyboard 1 is depressed, the Numlock key code is not sent to the host. Thus, the depression of the Numlock key does not affect the host 5.

In the case of this embodiment, the control IC of the ten key keyboard 1 counts the depressions of the Numlock key in a predetermined time. Thus, the control IC reliably determines which of zero, once, and successive plural times (for example, twice) is the number of times of the depression of the Numlock key.

As an alternate to a criterion at step 501, that is, the successive plural times of depressions, it may be determined whether or not a plurality of predetermined keys on the ten key keyboard 1 are concurrently depressed. In this case, there is the need for preventing key codes from being outputted even when such keys are simultaneously depressed. Thus, it is sufficient that known techniques for determining whether or not a phantom switch condition exists in a keyboard, and for preventing a wraparound current in a keyboard having, for example., an N-key rollover function are implemented in the keyboard 1. Furthermore, to enhance the reliability of the decision, additional depressions of the Numlock key may be included in the decision process.

In the case that the number of depressions of the Numlock key is 0, namely, the Numlock key is not depressed, control proceeds to step 203 without causing the mode transition.

In the case that the Numlock key is depressed only once, control advances to step 202 as described above with reference to FIG. 6 illustrating the first embodiment.

At step 202, as illustrated in FIG. 6, the control IC of the ten key keyboard 1 does not send the Numlock key code to the host 5 but causes the transition of the mode of the internal pseudo Numlock state. That is, in the case of the ten key keyboard 1, when the internal pseudo Numlock state is in the ON mode, the transition of the mode of the internal pseudo Numlock state to the OFF mode, namely, the ordinary input mode, is performed. Conversely, when the internal pseudo Numlock state is in the OFF mode, the transition of the mode of the internal pseudo Numlock state to the ON mode, namely, the ten key input mode, is performed.

On the other hand, the host 5 does not receive the Numlock key code, and thus sends no LED turning-on command to the main keyboard 4. Therefore, the mode transition of the main keyboard 4 does not occur. The Numlock state thereof remains in the OFF mode, namely, the ordinary input mode. Thereafter, control proceeds to step 203.

When each of the keys on the ten key keyboard 1 is depressed at step 203, an ordinary key code inherent in each of the depressed key is sent to the host 5 at step 204, as described in the description of the first embodiment.

When it is judged at step 501 that the Numlock key is successively depressed a plurality of times, control advances to step 502. At that time, the Numlock key code is not sent to the host 5.

When the key code is changed and a certain key is depressed at step 502, another key code, which is entirely different from an ordinary key code inherent in such a key, is sent without transmitting the ordinary key code inherent therein. This mode of the state is referred to as an optional mode.

Users can preliminarily set what key code is outputted when a key is depressed in the optional mode. Data representing such settings is stored in a readable/writable memory in the control IC of the ten key keyboard 1. Such data can be changed by exchanging the memory or editing through software.

For example, in the case of utilizing the Numlock key in place of the Backspace key, it is sufficient to preliminarily set the keyboard so that when the Numlock key is depressed in the optional mode, the key code "OE"hex corresponding to the key code that corresponds to the Backspace key. Additionally, the key layout may be changed to that suitable for an electric calculator. Alternatively, the setting of a certain key by allotting this key as a Web connecting key may be performed correspondingly to a specific key code.

To enable users to easily distinguish the function corresponding to each of the changed key codes, which are outputted in the aforementioned optional mode, a mapping guidance on the correspondence relation between the keys and the functions in the optional mode may be indicated on the screen of the display unit of the host 5.

At step 504, it is determined how many times the Numlock key on the ten key keyboard 1 is depressed. The control IC makes such a determination by counting the depressions of the Numlock key in a predetermined time, as in the case of step 501. Thus, the control IC reliably determines which of zero, once, and successive plural times (for example, twice) is the number of times of depression of the Numlock key.

Further, regarding an alternate to a criterion at step 504, as described above, the successive plural times of depressions, it may be determined whether or not a plurality of predetermined keys on the ten key keyboard 1 are concurrently depressed. In this case, there is a need for preventing key codes from being outputted even when such keys are simultaneously depressed. Thus, it is sufficient that known techniques for determining whether or not a phantom switch condition exists in a keyboard, and for preventing a wraparound current in a keyboard having, for example, an N-key rollover function are implemented in the keyboard 1. Furthermore, to enhance the reliability of the decision still more, additional depressions of the Numlock key may be included in the decision process.

When it is judged at step 504 that the number of depressions of the Numlock key is 0, namely, the Numlock key is not depressed, control returns to step 502 again.

When it is judged at step 504 that the Numlock key is depressed plural times, control advances to step 203. That is, the successive plural times of depressions of the Numlock key cancel the optional mode. At that time, the Numlock key code is not sent to the host 5.

Thus, in a process consisting of steps 501, 502, 503, 504, 203, and 204, the output code is switched between the ordinary key code and the key code, which differs from the ordinary key code, by the successive plural operations of the Numlock key. Then, the resultant key code can be sent to the host 5.

When the Numlock key is depressed only once at step 504, control advances to step 202. At that time, the Numlock key is not sent to the host 5. This single depression of the Numlock key cancels the optional mode. Moreover, the transition of the input mode of the ten key keyboard from the input mode (that is, the ordinary input mode or the ten key input mode), in which this keyboard is put just before brought into the optional mode, to the different input mode, is performed. Consequently, the ordinary key code is outputted in the new input mode by depressing the key.

Thus, according to the second embodiment of the present invention, the function of the ten key keyboard can be expanded still more by providing an optional mode in which the key code outputted from the ten key keyboard is changed. Further, the alteration to the optional mode is performed correspondingly to the successive depressions of the Numlock key. This effectively utilizes the feature of the second embodiment of the present invention in that even when the Numlock key on the ten key keyboard is depressed, the Numlock key code is not sent to the host.

That is, a mode in which a second key code, differing from the ordinary key code predetermined correspondingly to the ten key keyboard is sent out only by the process performed in the ten key keyboard, is provided in this embodiment. Thus, the function of the ten key keyboard can be expanded without affecting the host and the main keyboard.

Further, the aforementioned first and second embodiments of the present invention are not limited to the ten key keyboard, and may be applied to auxiliary keyboards, such as a keyboard having a multimedia-key function.

Meanwhile, as described above, generally, the ordinary keyboards of notebook personal computers include no independent ten-key pad serving as a key array provided so as to facilitate the entering of numeric data. Therefore, when a user enters numeric data, usually, he utilizes numeric keys of a key array 11 provided as a part of what is called an "E-line" of ordinary character keys (for instance, what is called the Japanese 109 Keyboard) of the main keyboard, or alternatively, brings the keyboard into a ten key input mode by using a Numlock (or Numeric Lock) function.

Furthermore, ten key keyboards illustrated in FIG. 2 are frequently used as external auxiliary keyboards for notebook personal computers. In such a case, the key input state of the computer is changed to the ten key input mode or the ordinary input mode by depressing the Numlock key.

When a user enters numeric data by using the ten key keyboard, first, the Numlock state is checked by watching the LED provided on the ten key keyboard. Then, in the case that the Numlock state is not in the ON mode, the Numlock state should be changed into the ON mode by depressing the Numlock key on the ten key keyboard so that the transition of the mode of the computer is changed into the ten key input mode. Conversely, in the case where an ordinary key input is desired during the Numlock state is in the ON state, the Numlock state should be changed into the OFF mode by depressing the Numlock key of the ten key keyboard so that the transition of the mode of the computer to the ordinary input mode is achieved.

In either case, when a user performs a key input operation when the Numlock state is in an input mode which he does not desire, he necessarily performs an operation of switching the input mode of the ten key keyboard by depressing the Numlock key. This is inconvenient for users. Generally, when a ten key keyboard is used, keys each having two functions assigned to single input data, for example, the "0Ins" key, . . . , the "9PgUp", ".Del" key, are usually used as the keys operated in such a case. Such keys are used for performing an operation of moving a cursor, in addition to operations of entering numeric data. It is convenient to automatically perform an input mode switching operation, which reflects a user's intention, when such a specific key having two alternative input modes is depressed.

A third embodiment, which will be described hereinbelow, of the present invention solves such problems and is a keyboard adapted to be automatically put into an input mode that reflects a user's intention when he depresses a specific key having two different alternative input modes. Incidentally, a ten key keyboard is the keyboard that is the third embodiment to be described hereinbelow.

Figure 11:
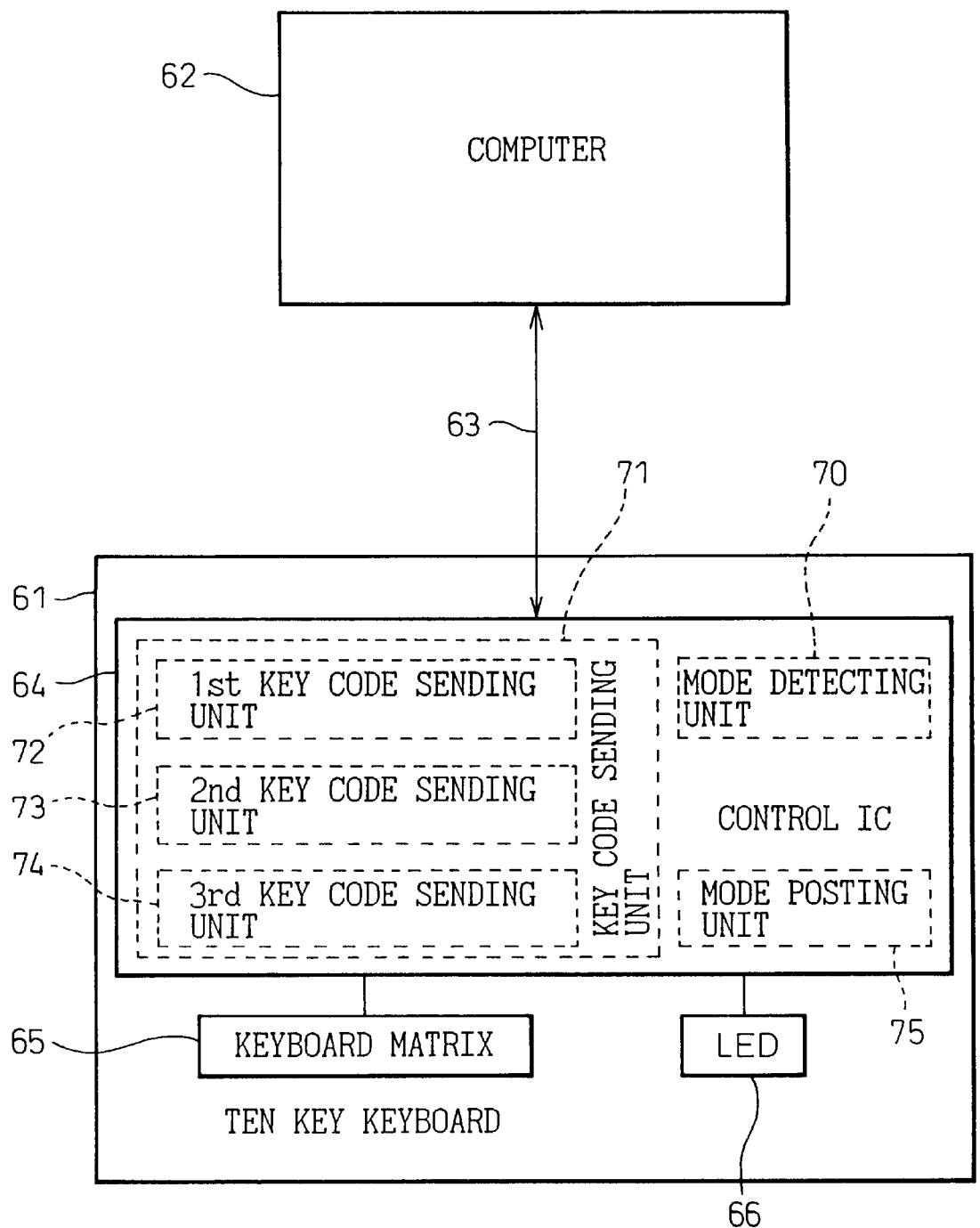
FIG. 11 is a schematic diagram illustrating the relation between a computer and a ten key keyboard of a third embodiment of the present invention.

FIG. 11 is a schematic diagram illustrating the relation between a computer and the ten key keyboard according to the third embodiment of the present invention.

Incidentally, a ten key keyboard 61 according to the third embodiment of the present invention, which is described hereinbelow, is directly and singly connected to a computer 62. However, additionally, a main keyboard may be further connected to the computer 62. Furthermore, the ten key keyboard 61 may be connected to the computer 62 through the main keyboard.

As illustrated in FIG. 11, in this embodiment, a USB cable is used for connecting the ten key keyboard 61 to the computer 62. However, alternatively, for instance, a PS/2 cable, or an RS-232C cable may be used therefor.

The ten key keyboard 61 comprises a mode detecting means 70 for detecting a mismatch between an input mode of the ten key keyboard 61 and an input mode of the computer 62, and a key code sending means 71 for adding, when the mismatch is detected by the mode detecting means 70 and then a specific key having the two alternative input modes is depressed, switch key codes to before and after a key code corresponding to the specific key and for sending the key codes. The ten key keyboard 61 further comprises a mode posting means 75 for posting information to the computer so as to indicate on the screen of the display unit of the computer which of the two input modes the keyboard is in.

The key code sending means 71 comprises a first key-code sending means 72 for sending a switch key code, which directs to switch the input mode of the computer 62, to the computer 62 when the mismatch is detected by the mode detecting means 70 and the specific key is depressed, a second key-code sending means 73 for sending a key code corresponding to the computer 62 after the first key-code sending means 72 sends the switch key code, and a third key-code sending means 74 for sending the switch key code to the computer 62 again after the second key-code sending means 73 sends the computer the key code corresponding to the specific key.

The ten key keyboard 61 has a control IC 64, a keyboard matrix 65, and an LED 66. The functions of the mode detecting means 70, the first key-code sending means 72, the second key-code sending means 73, and the third key-code sending means 74 are implemented by the control IC 64. The detection of the depression of each of the keys on the ten key keyboard 61 can be performed by the keyboard matrix 65. Further, the Numlock state of the ten key keyboard 61 is indicated to users by turning on or off the LED 66.

Next, an operating principle of the third embodiment of the present invention is described hereinbelow.

As described above, in the prior art, when numeric data is entered by using the ten key keyboard, the Numlock state of the computer is put into the ON mode to thereby bring the computer into the ten key input mode. Further, when, for instance, a cursor moving operation is performed by using the ten key keyboard, the Numlock state of the computer 62 is changed into the OFF mode to thereby put the computer 62 into the ordinary input mode. Thus, it is understood that, only when a current input mode is not a desired one for a user, he should depress the Numlock key to thereby change the input mode.

The third embodiment of the present invention is obtained by focusing an attention on such a feature.

That is, a Numlock state, which changes independently of the Numlock state of the computer 62, of the ten key keyboard 61 is provided in this embodiment. Further, the Numlock state of the computer 62 and the Numlock state of the ten key keyboard 61 are always monitored to thereby detect a match or a mismatch between these two Numlock states. When a mismatch therebetween is detected, this means that the current input mode of the ten key keyboard 61 is not desired by a user. Thus, when a specific key is depressed, the transition of the input mode of the computer 62 is caused just before or after the key code corresponding to the depressed specific key is sent. Conversely, when there is a match between the two Numlock states, this means that the ten key keyboard 61 is in the input mode which the user desires. Thus, even when the specific key is depressed, the input mode of the computer is not changed, and the key code is sent out without being altered.

Incidentally, the functions of the mode detecting means 70, the first key-code sending means 72, the second key-code sending means 73, and the third key-code sending means 74 may be implemented by software or programs for the computer 62 and the CPU, instead of using the control IC 64. In this case, the Numlock state of the computer 62 and the Numlock state of the keyboard 61 are managed in the computer 62 itself.

Thus, the Numlock states of the ten key keyboard 61 and the computer 62 are always monitored to thereby detect a match or a mismatch therebetween. Then, it is determined according to a result of the detection whether or not the input mode of the computer should be changed when the specific key is depressed. Consequently, users can use the ten key keyboards without concerns for operating the Numlock key.

Figure 12:
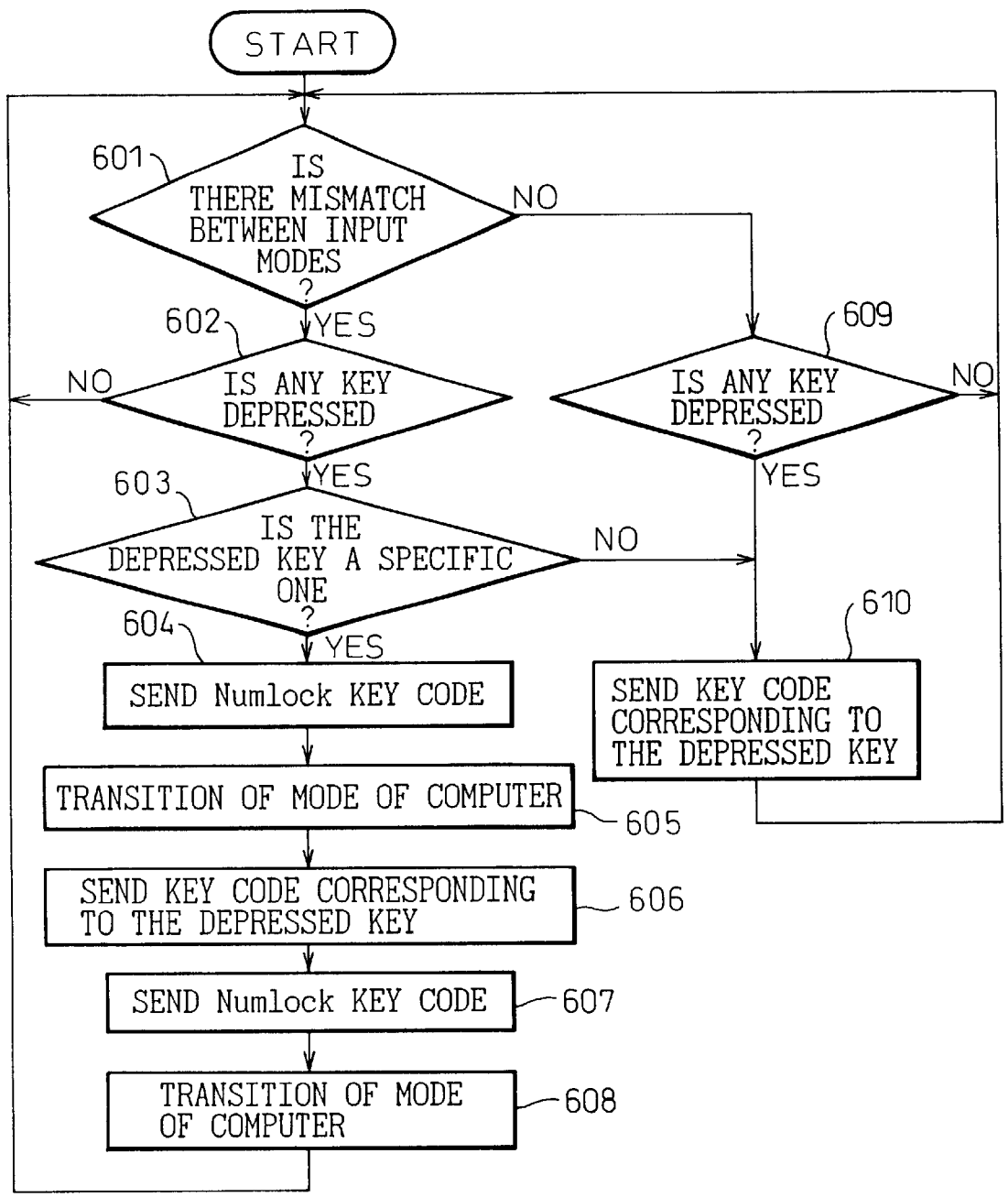
FIG. 12 is a flowchart illustrating a fundamental operation of a keyboard of the third embodiment of the present invention.

FIG. 12 is a flowchart illustrating a fundamental operation of the keyboard according to the third embodiment of the present invention.

The control IC 64 of the ten key keyboard 61 of this embodiment monitors the Numlock states of the ten key keyboard 61 and the computer 62 at step 601 to thereby detect a mismatch between the Numlock states of the ten key keyboard 61 and the computer 62. That is, the mode detecting means 70 realized by the control IC 64 of the ten key keyboard 61 monitors whether one of an LED turning-on command and an LED turning-off command is send from the computer 62. In the case that an LED turning-on command is sent therefrom, the Numlock state of the computer 62 is in the ON mode (that is, the ten key input mode). In contrast, in the case that an LED turning-off command is sent therefrom, the Numlock state of the computer 62 is in the OFF mode (namely, the ordinary input mode).

Thus, the ten key keyboard 61 can know the Numlock state of the computer 62 from each of the commands. Thus, it is decided from the comparison between the known Numlock state of the computer 62 and the Numlock state of the ten key keyboard 61 itself whether or not the Numlock states of the ten key keyboard 61 and the computer 62 are matched to each other. In the case that there is a mismatch therebetween, control advances to step 602. Conversely, in the case that there is not a mismatch therebetween, control proceeds to step 609.

Incidentally, when the power supply for the computer 62, to which the ten key keyboard 61 according to this embodiment is connected, is turned on, the Numlock state of the computer 62 is put into a default state after the predetermined initialization process. At that time, one of the LED turning-on command and the LED turning-off command is necessarily sent from the computer 62. Thus, just after the power supply is turned on, the ten key keyboard 61 can know the default Numlock state of the computer 62.

At step 602, it is detected, by using the key matrix 65, whether there is a depression of a key on the ten key keyboard 61. When there is such a depression, control advances to step 603. Conversely, when there is no depression of such a key, control returns to step 601.

At step 603, it is judged whether or not the depressed key is a specific key having two different alternative input modes. In the case that the depressed key is such a specific key, control advances to step 604. Conversely, in the case that the depressed key is not a specific key, control proceeds to step 610.

As described above, in the case of the ten key keyboard illustrated in FIG. 2, two functions are assigned to single data input thereto. Generally, keys, such as the "0Ins" key to the "9PgUp" key and the ".Del" key, are used for a cursor moving operation, in addition to the entering of numeric data. However, when the aforementioned specific key, to which the two functions are allotted, is depressed, an input mode switching operation, which reflects the user's intention, is automatically performed, especially, on such a specific key through a process consisting of steps 604 to 608. Thus, this key code is sent out. Consequently, users can use the ten key keyboard 61 without any concern about operating the Numlock key.

Incidentally, in the case of this embodiment, the "0Ins" key to the "9PgUp" key, and the ".Del" key, which serve as specific keys, are preliminarily stored in the control IC 64. However, users can change, add and delete the keys. Data representing such settings is stored in a readable/writable memory in the control IC 64 of the ten key keyboard 61. Such data can be changed by exchanging the memory or, alternatively, by editing using software programs.

In the case of the ten key keyboard illustrated in FIG. 2, when a key operation is performed on each of keys, to each of which only one function is assigned, for example, the "+" key, and the "Enter" key, other than the aforementioned specific keys, only one function is effective. Thus, when such a key is depressed, a corresponding key code is sent out without causing a mode transition. Consequently, control advances to step 610.

At step 604, the first key-code sending means 72 implemented by the control IC 64 of the ten key keyboard 61 transmits a switching key code for directing the switching of the input mode of the computer. In this embodiment, a dummy Numlock key code serving as a switching key code is sent to the computer 62. Usually, this dummy Numlock key code is the same as the Numlock key code to be outputted when the Numlock key is depressed. Note that such a dummy Numlock key code is transmitted in this embodiment without depressing a Numlock key.

Incidentally, as will be described later, even when the Numlock key on the ten key keyboard 61 is depressed, a Numlock key code, which is transmitted in the case of the prior art, is not transmitted in this embodiment.

Subsequently, at step 605, the computer 62 receives the dummy Numlock key code. Then, the transition of the mode of the Numlock state thereof is caused. That is, in the case that the Numlock state of the computer 62 is in the ON mode (namely, the ten key input mode), the mode is changed to the OFF mode (namely, the ordinary input mode). Conversely, in the case that the Numlock state of the computer 62 is in the OFF mode, the mode is changed to the ON mode.

Furthermore, at that time, as described above, when receiving the Numlock key code corresponding to the Numlock key, the computer 62 sends an LED turning-on command or an LED turning-off command to the ten key keyboard 61. This ten key keyboard 61 of this embodiment ignores such a command. Thus, a current Numlock state (that is, the current input mode) of the ten key keyboard 61 is maintained irrespective of the presence or absence of a response from the computer 62 that receives the Numlock key code.

Then, at step 606, the second key-code sending means 73 implemented by the control IC of the ten key keyboard 61 sends a key code, which corresponds to the depressed specific key, to the computer 62.

Subsequently, at step 607, the third key-code sending means 74 implemented by the control IC 64 of the ten key keyboard 61 transmits the switching key code again, which directs the switching of the input mode of the computer. In this embodiment, the dummy Numlock key code is sent to the computer 62 again.

Then, at step 608, the computer 62 receives the dummy Numlock key code again. Thus, the transition of the mode of the Numlock state is caused. That is, in the case that the Numlock state of the computer 62 is in the OFF mode, the transition of the mode to the ON mode is caused. Conversely, in the case that the Numlock state of the computer 62 is in the ON mode, the transition of the mode to the OFF mode is caused. Thus, the state of the computer 62 returns to the Numlock state at the time just before the specific key is depressed.

Incidentally, as at step 605, the computer 62 sends an LED turning-on command or an LED turning-off command to the ten key keyboard 61 when receiving the key code corresponding to the Numlock key. However, the ten key keyboard 61 of this embodiment ignores such a command, so that the current Numlock state of the ten key keyboard 61 is maintained. Then, control returns to step 601.

When it is judged at step 601 at step 601 that there is a match between the Numlock states, control proceeds to step 609. That is, when it is judged that the Numlock states of the ten key keyboard 61 and the computer 62 match with each other, this means that the ten key keyboard 61 is in the input mode that users desire. Thus, the key code is transmitted without switching the input mode of the computer just before or after the transmission of the key code corresponding to the depressed key.

At step 609, it is detected by using the key matrix 65 whether or not a key on the ten key keyboard 61 is depressed. When the depression of such a key is detected, control advances to step 610. Conversely, when the depression of such a key is not detected, control returns to step 601.

At step 610, a key code corresponding to the depressed key is sent to the computer 62. The key code sent at this step 610 includes a key code corresponding to the key judged at step 603 as being not the specific key. Then, control returns to step 601.

Meanwhile, when the Numlock key on the ten key keyboard 61 is depressed, the Numlock key code, which is transmitted in the prior art in such a case, is not sent to the computer 62 in this embodiment. The mode transition of the ten key keyboard 61 is caused independently of that of the computer 62.

Therefore, in this embodiment, the transition of the mode of the Numlock state of the computer 62 cannot be caused by depressing the Numlock key on the ten key keyboard 61. Thus, usually, the default Numlock state at the time of turning on the power supply for the computer 62 is maintained.

Accordingly, when a user intentionally changes the Numlock state of the computer 62, the transition of the mode of the Numlock state of the computer 62 should be caused by depressing a Numlock key on another keyboard connected to the computer, other than the ten key keyboard 6, in this embodiment to thereby send the Numlock key code. In this case, when a Numlock key code is transmitted from the keyboard, which differs from the ten key keyboard 61, in this embodiment, the transition of the mode of the Numlock state of the computer 62 is caused, so that the computer 62 sends one of an LED turning-on command or an LED turning-off command to each of the keyboards.

As described above, in the ten key keyboard 61 of this embodiment, the mode detecting means 70 implemented by the control IC 64 detects, from the sent LED turning-on command or the sent LED turning-off command, a match or a mismatch between the input modes of the ten key keyboard 61 and the computer 62. However, even when receiving either of these commands, the ten key keyboard 61 of this embodiment does not cause a mode transition of the Numlock state thereof.

As described above, the transition of the mode of the Numlock state of the ten key keyboard 61 in this embodiment is caused only when the Numlock key on the ten key keyboard 61 is depressed. This mode transition is caused independently of the computer 62.

Figure 13:
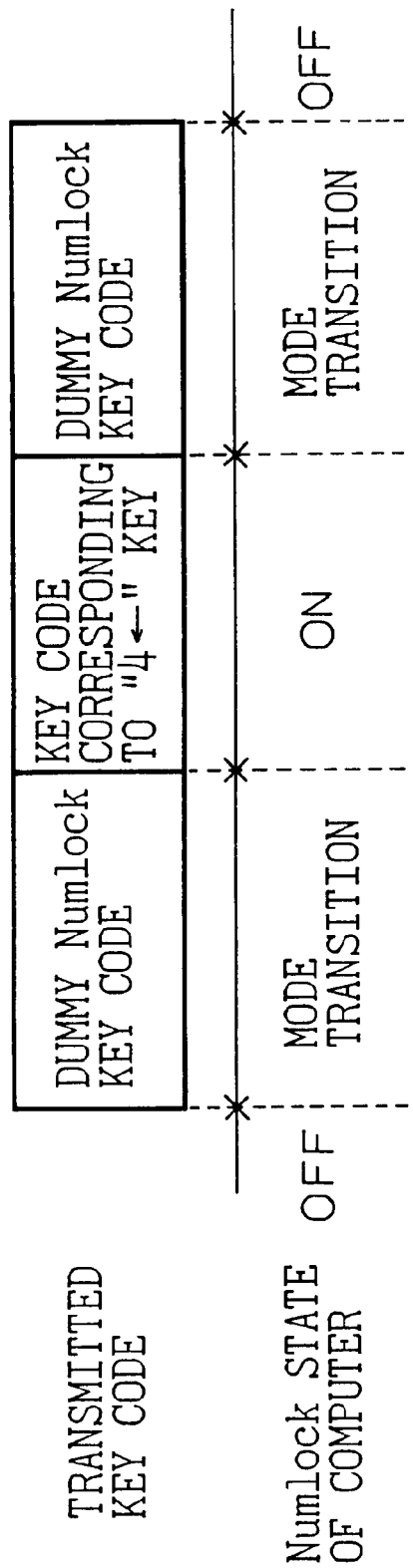
FIG. 13 is a time chart illustrating a key code to be sent in the third embodiment of the present invention.

FIG. 13 is a time chart illustrating the key code transmitted in the third embodiment of the present invention.

This figure illustrates the case that the "4←" key, which is one of the predetermined specific keys, is depressed when the Numlock state of the ten key keyboard 61 is in the ON mode and the Numlock state of the computer 62 is in the OFF mode before the depression of the specific key having different two input modes. As illustrated in the flowchart of FIG. 12, operations respectively performed at steps 601 to 608 are sequentially performed.

As illustrated in FIG. 13, the Numlock state of the computer 62 is in the OFF mode before then. However, when the "4←" key is depressed, the dummy Numlock key code is transmitted, so that the transition of the mode of the Numlock state of the computer to the ON mode is performed. The dummy Numlock key code includes data that indicates the release of the Numlock key and that is not necessarily needed at this stage.

When the Numlock state of the computer 62 is put into the ON mode, namely, the ten key input mode, the key code corresponding to the "4←" key is transmitted. Then, the numeral "4" is indicated on the screen of the display unit of the computer 62. Upon completion of depression of the "4←" key, the dummy Numlock key code is transmitted again. Thus, the Numlock state of the computer 62 returns to the OFF mode. Incidentally, the dummy Numlock key code at that time should include data indicating the release of the Numlock key.

As described with reference to FIGS. 11 to 13, according to this embodiment, when one of the specific keys which have two different input modes, on the ten key keyboard 61, is depressed when the Numlock state of the ten key keyboard 61 differs from that of the computer 62, the transition of the mode of the computer 62 is caused temporarily, so that the key code corresponding to the depressed specific key is transmitted. This operation is performed at every depression of each individual specific key. It is not always efficient to perform the aforementioned operation corresponding to each of the specific keys in the case that the plurality of specific keys are successively depressed. Especially, when a user skilled in keying or typing operations successively enters plural numeric data by using, for example, a ten key keyboard, the successive depressions of the keys may overlap in time even in the case that the keys are depressed one by one.

Therefore, in an alternate to the third embodiment of the present invention, in the case that the successive depressions of the keys may overlap in time when the plural specific keys are successively depresses, the key code corresponding to the Numlock key is sent by the third key-code sending means to the computer 62, upon completion of transmission, which is performed by the second key-code sending means 73, of key codes respectively corresponding to the plural specific keys, the successive depressions of which overlap in time. Thus, the input mode of the Numlock state is returned to the initial input mode to thereby enhance the efficiency still more.

Figure 14:
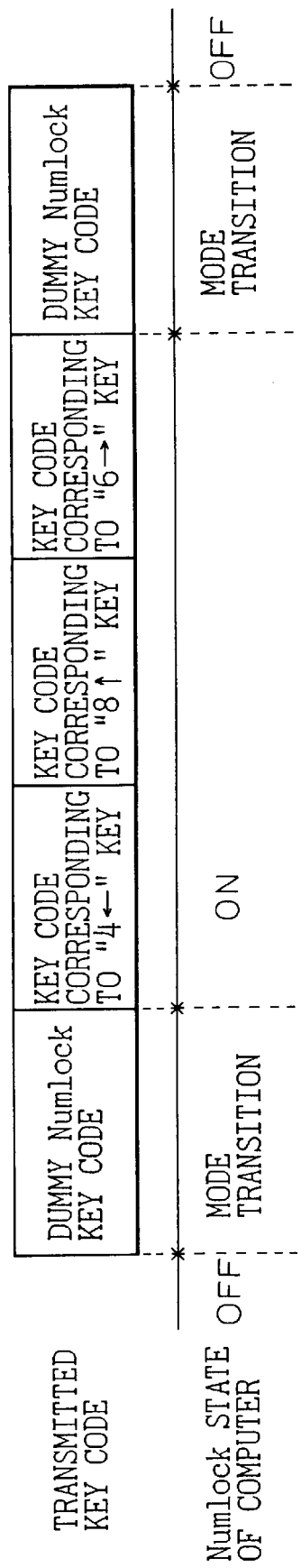
FIG. 14 is a time chart illustrating a key code to be sent in an alternate to the third embodiment of the present invention.

FIG. 14 is a time chart illustrating the key code transmitted in an alternate of the third embodiment of the present invention.

This flowchart illustrates the case that the "4←" key, the "8↑" key and the "6→" key are successively depressed when the Numlock state of the ten key keyboard 61 is in the ON mode and the Numlock state of the computer 62 is in the OFF mode before the depression of the specific key, and that the successive depressions of the "4←" key, the "8↑" key and the "6→" key overlap in time.

As in the case of the third embodiment, when the specific keys on the ten key keyboard 61 are depressed when the Numlock states of the ten key keyboard 61 and the computer 62 differ from each other, the transition of the mode of the Numlock state of the computer 62 is temporarily performed, so that the key code corresponding to the depressed specific key is transmitted. However, in this alternate, the key codes corresponding to the specific keys, the depressions of which overlap in time, are collectively transmitted during the transition of the mode of the Numlock state of the computer 62 is temporarily caused.

As illustrated in FIG. 14, the Numlock state of the computer 62 used to be in the OFF mode. However, when the "4←" key is depressed, the dummy Numlock key code is transmitted, so that the transition of the mode of the Numlock state of the computer to the ON mode is performed. The dummy Numlock key code includes data that indicates the release of the Numlock key and that is not necessarily needed at this stage.

When the Numlock state of the computer 62 is put into the ON mode, namely, the ten key input mode, the key code corresponding to the "4←" key is transmitted. However, when the "8↑" key is depressed before the completion of the depression of the "4←" key, the key code corresponding to the "8↑" key is transmitted. Furthermore, when the "6→" key is depressed before the completion of the depression of the "8↑" key, the key code corresponding to the "6→" key is transmitted. Upon completion of the depression of the "6→" key, the dummy Numlock key code is transmitted again, so that the mode of the Numlock state of the computer 62 returns to the OFF mode. The Numlock key code at that time necessarily includes the Numlock key release data. Thus, the numerals "4", "8" and "6" are indicated on the screen of the display unit of the computer 62.

Incidentally, when the specific key is depressed before the completion of the depression of the "6→" key, the key code corresponding to the depressed specific key is transmitted. Such an operation is repeated during a time period in which the successive depressions of the keys overlap in time. However, at a point in time at which the successive depressions of the keys do not overlap in time, the dummy Numlock key code is transmitted again, so that the mode of the Numlock state of the computer 62 returns to the initial mode.

It is sufficient that the control IC 64 judges whether or not the predetermined plural specific keys are simultaneously depressed, in consideration of known techniques for determining whether or not a phantom switch condition exists in the keyboard, and for preventing a wraparound current in the keyboard having, for example, an N-key rollover function.

Next, a method of using the ten key keyboard of the third embodiment of the present invention is described hereinbelow.

FIG. 15 illustrates the combinations of the Numlock states of the ten key keyboard and the computer of the third embodiment of the present invention.

As described above, when the power supply for the computer 62, to which the ten key keyboard 61 according to this embodiment is connected, is turned on, the Numlock state of the computer 62 is put into a default state after the predetermined initialization process. At that time, one of the LED turning-on command and the LED turning-off command is necessarily sent from the computer 62. Thus, the ten key keyboard 61 can know the default Numlock state of the computer 62 at the time just after the power supply is turned on.

Hereinafter, the case of depressing the "4←" key, which is one of the specific keys, is described by way of example.

When a user depresses the "4←" key during a state "A" in which the Numlock state of the computer 62 is in the ON mode and the Numlock state of the ten key keyboard 61 is in the OFF mode, the Numlock state of the ten key keyboard 61 differs from the Numlock state of the computer 62, so that the Numlock state of the computer 62 is temporarily changed into the OFF mode. Thus, the cursor on the screen of the display unit moves.

When the user wishes to indicate the numeral "4" on the screen of the display unit in the case of the state "A", he depresses the Numlock key on the ten key keyboard 61 to thereby put the Numlock state of the ten key keyboard 61 into the ON mode (namely, the state "B"). At that time, as described above, the Numlock state of the computer 62 does not change. In this case, the Numlock states of the ten key keyboard 61 and the computer 62 are the same. Thus, the Numlock state of the computer 62 is maintained in the ON mode, and the numeral "4" is indicated on the screen of the display unit.

When the user depress the "4←" key in the case of the state "C" in which the Numlock state of the computer 62 is in the OFF mode and the Numlock state of the ten key keyboard 61 is in the OFF mode, the Numlock states of the ten key keyboard 61 and the computer 62 are the same. Thus, the Numlock state of the computer 62 is maintained in the ON mode, and the numeral "4" is indicated on the screen of the display unit.

When the user wishes to indicate the numeral "4" on the screen of the display unit in the case of the state "C", he depresses the Numlock key on the ten key keyboard 61 to thereby put the Numlock state of the ten key keyboard 61 into the ON mode (namely, the state "D"). At that time, as described above, the Numlock state of the computer 62 does not change. In this case, the Numlock states of the ten key keyboard 61 and the computer 62 differ from each other. Thus, the Numlock state of the computer 62 is temporarily changed into the ON mode. Consequently, the cursor on the screen of the display unit moves.

Thus, according to the third embodiment of the present invention, users can utilize the ten key keyboard 61 without concern for the Numlock state of the computer 62, by suitably operating the Numlock key on the ten key keyboard 61.

Incidentally, users can know the Numlock state of the ten key keyboard 61 from the Numlock state indicating LED 66 provided on the ten key keyboard 61 illustrated in FIG. 11. Furthermore, each of the Numlock state of the ten key keyboard 61 and the Numlock state of the computer 62 may be indicated on the screen of the display unit.

The aforementioned third embodiment of the present invention is not limited to the auxiliary keyboard, such as the ten key keyboard. The present invention may be applied to auxiliary keyboards, such as a keyboard having a multimedia-key function.

Thus, according to the third embodiment of the present invention, the Numlock state having modes, the transition of which is performed independently of the Numlock state of the computer, is provided in the ten key keyboard. Further, the Numlock states of the computer and the ten key keyboard are always monitored to thereby detect the match or mismatch between the two Numlock states. Then, it is determined according to a result of the detection whether or not the switching of the input modes of the computer is needed at a depression of the specific key having different two alternative input modes. Thus, users can use the ten key keyboard without concern for operating the Numlock key. Consequently, the operability in input to the computer can be improved.

As described above, according to the first embodiment of the present invention, the transition of the mode of the Numlock state of only the ten key board is achieved by depressing the Numlock key on the ten key keyboard. Moreover, the Numlock state of the main keyboard can be maintained in the OFF mode. Therefore, the ten key keyboard can easily be used in a mode switched between the ten key input mode and the ordinary input mode. Simultaneously, the main keyboard can be always used in the ordinary input mode, regardless of the mode of the ten key keyboard. That is, the function corresponding to each of keys arranged on the main keyboard can be always utilized. Consequently, the operability in key input is improved.

Further, according to the second embodiment of the present invention, there is provided a mode, in which a second key code differing from the ordinary key code predetermined corresponding to the ten key keyboard is sent out only by the process performed in the ten key keyboard. Thus, the function of the ten key keyboard can be expanded without affecting the host and the main keyboard.

Although the preferred embodiments of the present invention have been described above, it should be understood that the present invention is not limited thereto and that other modifications will be apparent to those skilled in the art without departing from the sprint of the invention.

The scope of the present invention, therefore, should be determined solely by the appended claims.

What is claimed is:

1. An auxiliary keyboard, connected to a computer having a main keyboard, which has a main input mode switching key for switching an input mode between a numeric data input mode and a character data input mode, and provided with a plurality of keys, having a first input mode and a second input mode, comprising:
   an input mode switching key;
   mode switching unit for switching between the first input mode and second input mode at each depression of said input mode switching key without posting the depression to said computer;
   key code sending unit for sending, when the key of said auxiliary keyboard is depressed, a predetermined first key code corresponding to said depressed key of said auxiliary keyboard either in the first input mode or in the second input mode; and
   mode correcting unit for correcting, when the input mode of said main keyboard is switched into the numeric data input mode, said numeric data input mode to the character data input mode.

2. The auxiliary keyboard according to claim 1, which further comprises display unit for indicating which of the first input mode and the second input mode said auxiliary keyboard is in.

3. The auxiliary keyboard according to claim 1, which further comprises mode posting unit for posting information to said computer so as to indicate on a screen of a display unit of said computer which of the first input mode and the second input mode said auxiliary keyboard is in.

4. The auxiliary keyboard according to claim 1, wherein a second key code, which differs from the first key code, is allocated.

5. The auxiliary keyboard according to claim 4, which further comprises key code transmitting unit for transmitting, when said key of said auxiliary keyboard is depressed, the second key code, which corresponds to said depressed key of said auxiliary keyboard, to said computer, wherein a key code corresponding to said input mode switching key is not sent to said computer after said input mode switching key is successively depressed at least twice.

6. The auxiliary keyboard according to claim 4, which further comprises key code transmitting unit for transmitting, when said key of said auxiliary keyboard is depressed, the second key code, which corresponds to said depressed key of said auxiliary keyboard, to said computer, wherein a key code corresponding to said input mode switching key and at least the one key code, which differs from the input mode switching key, are not sent to said computer after said input mode switching key and the key, which differs from said input mode switching key, are simultaneously depressed.

7. The auxiliary keyboard according to claim 4, which further comprises unit for indicating on a screen of a display unit of said computer each function corresponding to the second key code.

8. A keyboard having two input modes, adapted to assign two functions to one input, in each of which a corresponding one of the two functions is selected, and connected to a computer, said keyboard having the two input modes independently of said computer, said keyboard comprising:
   mode detecting unit for detecting a mismatch between an input mode of said keyboard and an input mode of said computer; and
   key code sending unit for adding, when the mismatch is detected by said mode detecting unit and then a specific key having the two alternative input modes is depressed, switch key codes before and after a key code corresponding to the specific key and for sending the key codes to said computer.

9. The keyboard according to claim 8, wherein a current input mode of said keyboard is maintained regardless of a response made by said computer when the switch key code is sent to said computer.

10. The keyboard according to claim 8, which further comprises display unit for indicating which of the two input modes said keyboard is in.

11. The keyboard according to claim 8, which further comprises mode posting unit for posting information to said computer so as to indicate on a screen of a display unit of said computer which of the two input modes said keyboard is in.

12. The keyboard according to claim 8, wherein said key code sending unit comprises:
   first key-code sending unit for sending a switch key code, which directs to switch the input mode of said computer, to said computer when the mismatch is detected by said mode detecting unit and the specific key is depressed;
   second key-code sending unit for sending a key code corresponding to said computer after said first key-code sending unit sends the switch key code; and
   third key-code sending unit for sending the switch key code to said computer again after said second key-code sending unit sends said computer the key code corresponding to the specific key.

13. The keyboard according to claim 12, wherein, in a case that the mismatch is detected by said mode detecting unit, and that depressions of a plurality of different specific keys overlap in time, said third key-code sending unit sends the switch key code to said computer upon completion of sending all the key codes corresponding to the specific keys by said second key-code sending unit.

14. A method of controlling an auxiliary keyboard connected to a computer having a main keyboard, which has a main input mode switching key for switching an input mode between a numeric data input mode and a character data input mode, and provided with a plurality of keys, having a first input mode and a second input mode and having a plurality of keys and an input mode switching key, comprising:

a mode switching step of switching between the first input mode and second input mode at each depression of said input mode switching key without posting the depression to said computer;

a key code sending step of sending, when the key of said auxiliary keyboard is depressed, a predetermined first key code corresponding to said depressed key of said auxiliary keyboard either in the first input mode or in the second input mode; and a mode correcting step of correcting, when the input mode of said main keyboard is switched into the numeric data input mode, said numeric data input mode to the character data input mode.

15. A keyboard having two input modes, adapted to assign two functions to one input, in each of which a corresponding one of the two functions is selected, and connected to a computer, said keyboard having the two input modes independently of said computer, said keyboard comprising:

mode detecting unit for detecting a mismatch between an input mode of said keyboard and an input mode of said computer;

key code sending unit for adding, when the mismatch is detected by said mode detecting unit and then a specific key having the two alternative input modes is depressed, switch key codes before and after a key code corresponding to the specific key and for sending the key codes;

an input mode switching key for switching between the two input modes, wherein, when said input mode switching key is depressed, switching between the two input modes of said keyboard is performed without posting the depression of said input mode switching key to said computer.

16. A method for controlling a keyboard having two input modes, adapted to assign two functions to one input, in each of which a corresponding one of the two functions is selected, and connected to a computer, said keyboard having the two input modes independently of said computer, said method comprising:

a mode detecting step of detecting a mismatch between an input mode of said keyboard and an input mode of said computer; and a key code sending step of adding, when the mismatch is detected at said mode detecting step and a specific key having the two alternative input modes is depressed, switch key codes before and after a key code corresponding to the specific key and sending the key codes to said computer.

* * * * *